(12) United States Patent
Hirose et al.

(10) Patent No.: US 7,382,479 B2
(45) Date of Patent: Jun. 3, 2008

(54) LINKING INFORMATION MAKING APPARATUS AND RECORDING MEDIUM

(75) Inventors: Akira Hirose, Kawasaki (JP); Tadao Michimura, Kawasaki (JP); Tadahiko Ikegaya, Kawasaki (JP); Keiko Shiraishi, Kawasaki (JP)

(73) Assignee: Fuji Xerox, Ltd., Tokyo (JP)

( * ) Notice: Subject to any disclaimer, the term of this patent is extended or adjusted under 35 U.S.C. 154(b) by 1077 days.

(21) Appl. No.: 10/414,210

(22) Filed: Apr. 16, 2003

(65) Prior Publication Data
US 2004/0080770 A1    Apr. 29, 2004

(30) Foreign Application Priority Data
Oct. 29, 2002    (JP)    ............... 2002-315008

(51) Int. Cl.
*G06F 3/12*    (2006.01)
(52) U.S. Cl. .............. 358/1.15; 358/1.13; 358/1.9; 715/762; 715/763; 715/769; 709/203; 710/15
(58) Field of Classification Search ............... 358/1.15, 358/1.13, 402, 1.9; 709/203; 710/15; 715/763, 715/769, 762
See application file for complete search history.

(56) References Cited

U.S. PATENT DOCUMENTS

| | | | | |
|---|---|---|---|---|
| 5,774,661 A | * | 6/1998 | Chatterjee et al. | 709/203 |
| 5,872,569 A | * | 2/1999 | Salgado et al. | 715/764 |
| 6,380,951 B1 | * | 4/2002 | Petchenkine et al. | 715/736 |
| 7,047,535 B2 | * | 5/2006 | Lee et al. | 719/328 |
| 7,065,493 B1 | * | 6/2006 | Homsi | 705/8 |
| 7,100,147 B2 | * | 8/2006 | Miller et al. | 717/102 |
| 7,184,967 B1 | * | 2/2007 | Mital et al. | 705/8 |
| 2003/0103232 A1 | * | 6/2003 | Twede | 358/1.15 |

FOREIGN PATENT DOCUMENTS

| | | | |
|---|---|---|---|
| GB | 2351580 A | * | 1/2001 |
| JP | A 6-12250 | | 1/1994 |
| JP | A 7-56725 | | 3/1995 |
| JP | A 7-191840 | | 7/1995 |
| JP | A-08-180110 | | 7/1996 |
| JP | A 9-223001 | | 8/1997 |
| JP | A-2002-063323 | | 2/2002 |
| JP | A-2002-074253 | | 3/2002 |
| JP | A-2002-169735 | | 6/2002 |
| JP | A-2002-259643 | | 9/2002 |
| WO | WO-01/88729 A1 | | 11/2001 |

* cited by examiner

*Primary Examiner*—Twyler L. Haskins
*Assistant Examiner*—Jacky X. Zheng
(74) *Attorney, Agent, or Firm*—Oliff & Berridge, PLC

(57) ABSTRACT

An instruction sheet making section of an instruction sheet editor displays on a GUI icons of services capable of being executed by using a service list sent from a service search server. Further, the instruction sheet making section also displays logic icons of linking processing patterns of the respective services. An instruction sheet making section combines the services provided by one or more service processing sections and makes an instruction sheet, by using service icons and logic icons selected by a user, while referring to and utilizing I/F information sent by the service processing section. Therefore, it is possible to easily combine the services capable of being executed on a network and produce a workflow.

19 Claims, 17 Drawing Sheets

FIG.3

I/F INFORMATION

| SERVICE CLASS |
|---|
| SERVICE NAME |
| SERVICE ICON |
| SERVICE LOCATION INFORMATION |
| INPUT |
| OUTPUT |
| PARAMETER RESTRICTION RULES |
| SERVICE LOCATION |
| METHOD NAME |
| INVOCATION METHOD |
| IMPLICIT ELEMENTS |

FIG.16

INSTRUCTION SHEET

| SERVICE CLASS |
| --- |
| SERVICE NAME |
| SERVICE ICON |
| SERVICE LOCATION INFORMATION |
| INPUT |
| OUTPUT |
| PARAMETER RESTRICTION RULES |
| SERVICE LOCATION |
| METHOD NAME |
| INVOCATION METHOD |
| IMPLICIT ELEMENT |
| FLOW<br>(INVOCATION, MAP, METHOD)<br>(CONTROL STRUCTURE, LOGIC OPERATION) |

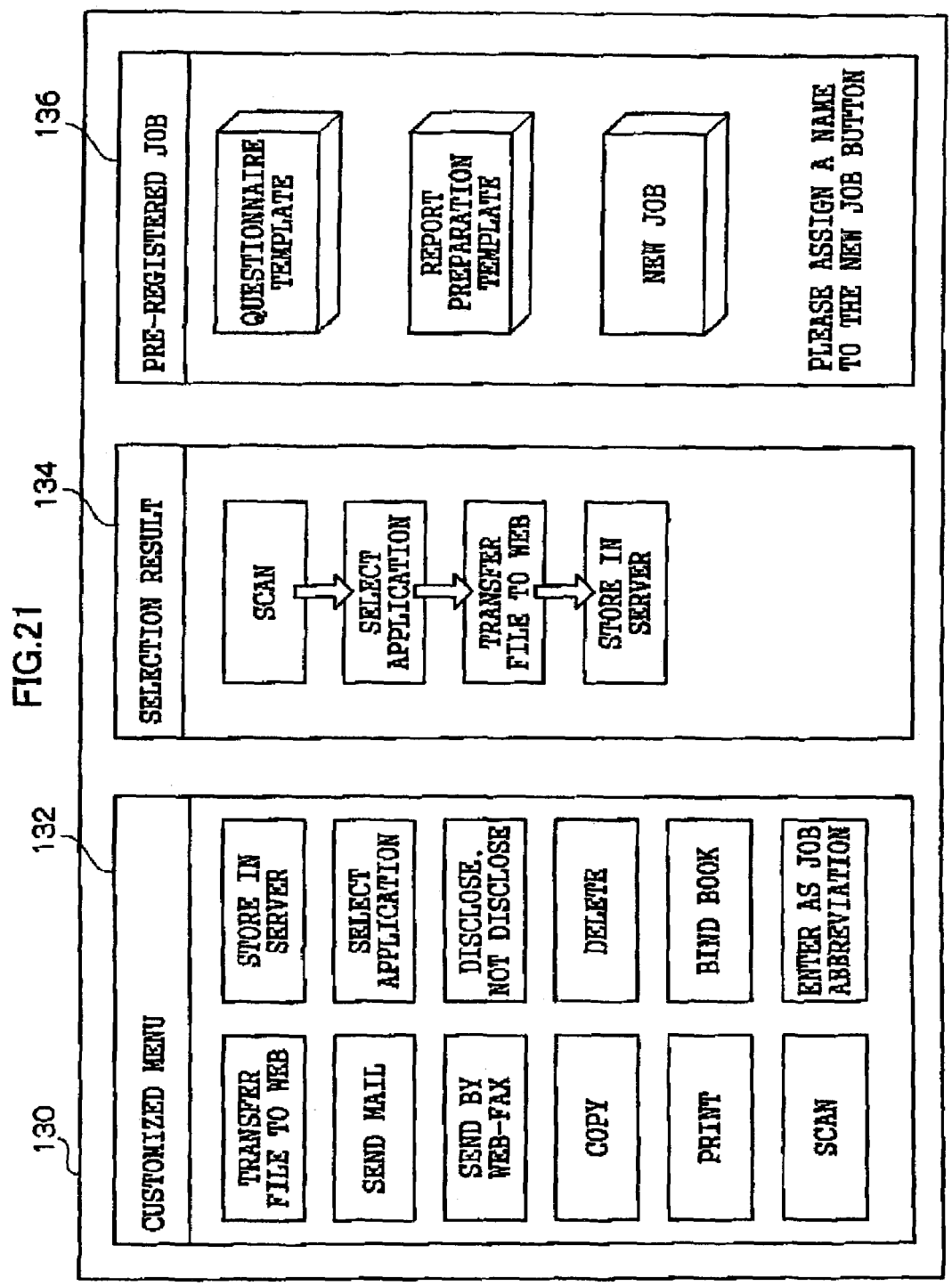

LINKING INFORMATION MAKING APPARATUS AND RECORDING MEDIUM

BACKGROUND OF THE INVENTION

1. Field of the Invention

The present invention relates to a linking information making apparatus and a recording medium and in particular, to a linking information making apparatus and a recording medium suitably applied to a work flow system that converts paper documents to electronic formats to construct a workflow.

2. Description of the Related Art

Workflow systems have been proposed in which scanners, facsimile machines, copiers, multifunction machines combining the functions of each these devices, personal computers, mail servers and the like are connected to each other by means of a network to thereby share paper documents and electronic information between workers. Particularly in office environments, conversion of paper documents to electronic formats and improvements in efficiency due to the introduction of a workflow system are desired.

On the other hand, in many cases, a workflow system is developed by converting an existing work system based on paper to electronic formats as is, on the assumption that workflows commonly used in the office such as obtaining approval or passing around circulars would be realized. For this reason, after the workflow system is developed, it is difficult to change the workflow and to further customize the workflow system so as to meet specific conditions.

Thus, when the workflow needs to be changed or a new service needs to be added to the workflow, such a fixed workflow system involves approximately the same amount of expense and development time as when developing a new workflow system.

Further, when a portion of service processing devices supplying services on the workflow system breaks down, the whole system becomes unusable. Thus, it becomes necessary for a system engineer or a system manager to restructure the system by replacing the broken service processing device with another service processing device.

Moreover, in recent years, technologies for providing web applications, which are web-based services existing on a network, in a linked manner have been proposed. There is a desired to reduce development costs by using these web applications as a portion of services of the workflow as required and providing them as services on demand.

In this respect, technologies which express functions graphically by using graphical symbols that are symbol information including icons, figures, letters and easily develop programs by visually combining the graphical symbols are well known (for example, see Japanese Patent Application Laid-open (JP-A) Nos. 9-223001, 7-56725, 7-191840, and 6-12250).

However, in the technologies of the related art for developing programs by using the aforementioned graphical symbols, the functions expressed by the graphical symbols are intended for only fixed functions previously defined in a system development environment. In other words, the technologies of the related art present a problem in that services (functions) constituting the workflow system cannot be readily added or changed.

SUMMARY OF THE INVENTION

The present invention has been achieved in order to solve the above-mentioned problems. It is an object of the invention to provide a linking information making apparatus and a recording medium in which, even if services constituting a workflow are changed or added, a workflow corresponding to the changed or added services can be easily produced.

To this end, an aspect of the present invention provides a linking information making apparatus comprising: a service information obtaining section for obtaining, via a network, information relating to respective services of performing a series of processing with respect to document data; a service display section for displaying service symbol information expressing the respective services based on the information relating to the respective services obtained by the service information obtaining section; and a linking information making section for making a series of linking information that logically links the respective services by using service symbol information selected from among the service symbol information displayed on the service display section.

According to the present aspect, the information relating to the respective services of performing a series of processing with respect to the document data is obtained via the network. Here, the information relating to the service is information which all of service processing sections (which will be described later) maintain in advance and which is used for making linking information for linking the respective services. The service symbol information expressing the respective services is displayed based on the information relating to the obtained respective services. A series of linking information that logically links the respective services is made by using service symbol information selected from among the displayed service symbol information.

Therefore, a user can ascertain the available services by using the displayed service symbol information and can easily make a series of linking information that logically links the desired services by selecting the displayed service symbol information. Further, even if services constructing a workflow are changed or added, a workflow corresponding to the changed or added services can be readily made.

In this respect, the service processing sections are sections for performing various services with respect to the document data such as searching, storing, copying, sending/receiving mail, sending/receiving facsimiles, electronic approval, image processing, and the like. The contents and the number of the services provided by the service processing sections are not restricted. Further, as for the document data, it is only essential that the document data is information relating to a document, and the document data may be character information such as text data, image information produced by reading a paper document or the like, and is not especially restricted.

In another aspect, the present invention provides a linking information making apparatus comprising: a service information obtaining section for obtaining, via a network, information relating to respective services of performing a series of processing with respect to document data; a service display section for displaying service symbol information expressing the respective services based on the information relating to the respective services obtained by the service information obtaining section; a logic information display section for displaying logic symbol information expressing logic information that logically links the respective services; and a linking information making section for making a series of linking information that logically links the respective services by using service symbol information selected from among the service symbol information displayed on the service display section and logic symbol information selected from among the logic symbol information displayed on the logic information display section.

According to the present aspect, further, the logic symbol information expressing the logic information that logically links the respective services is displayed and the logic symbol information selected from among the displayed logic symbol information are used together with the selected service symbol information to thereby make the series of linking information that logically links the respective services.

In this respect, the logic information that logically links the respective services is information showing logical linking processing patterns such as transition, branch, convergence, iteration or the like. The services of the selected service symbol information are linked by such logic information to make the series of linking information.

In this manner, it is possible to easily make the series of linking information that links the desired available services in a desired linking pattern.

In an aspect of the present invention, the linking information making section includes a property setting section for setting a property relating to a service corresponding to the selected service symbol information.

Here, the property is a parameter for defining the property of each service in more detail and its content varies depending on the service. For example, in a case of an OCR (Optical Character Reader) service, the property includes a mode of reading, a request for execution of a garbage erasing processing or an automatic rotational processing at the time of reading, and the like. By setting the property, the linking information desired by the user can be made.

In an aspect of the present invention, the information relating to the service includes information relating to input/output of the service, and wherein the linking information making section determines whether or not there is consistency in a state of linking between the respective services based on the information relating to the input/output of the respective services corresponding to the selected service symbol information and, when it is determined that there is inconsistency between the respective services, informs that there is inconsistency.

Here, the information relating to the input/output of the service includes information of the number of data and the type of data, inputted to the service, and information of the number of data and the type of data, outputted from the service. For example, it is possible to determine that when there is a match in the information relating to the input/output between services executed continuously, a state of linking is consistent, and that when there is not a match, the state of linking is not consistent. When the state of linking is not consistent, the user is informed of the inconsistency. Thus, even if the user is not familiar with the connectivity of the services, the user can easily know the state of linking between the services and correct the state of linking by, for example, selecting another service symbol information to replace it.

In an aspect of the present invention, the linking information making apparatus further comprises an editing section that, after linking information is made by the linking information making section, edits the made linking information.

This makes it possible to easily change the linking information when the made linking information have to be changed or when a service in the linking information is changed.

In an aspect of the present invention, the linking information making apparatus further comprises an execution-state display section for displaying a state of execution of the linking information made by the linking information making section.

This makes it possible to quickly respond to a case where a problem occurs during the execution of the linking information.

In an aspect of the present invention, the service symbol information is figures and/or sequences of characters expressing the respective services.

This makes it possible for the user to easily identify the respective selectable services. Here, the figures and/or the sequences of characters expressing the respective services include, for example, icons and graphical symbols of symbol information including figures and characters.

In an aspect of the present invention, the linking information making apparatus further comprises a selection results display section that, before the linking information making section makes the linking information, displays information regarding to the service symbol information selected from among the service symbol information displayed on the service display section.

This makes it possible for the user to easily know the selection results of the service symbol information.

In an aspect of the present invention, the logic symbol information is figures and/or sequences of characters expressing the logic information that logically links the respective services.

This makes it possible for the user to readily identify the respective selectable logic information. Here, the figures and/or the sequences of characters expressing the respective logic information include, for example, graphical symbols of symbol information including icons, figures and characters.

In an aspect of the present invention, the linking information making apparatus further comprises a selection results display section that, before the linking information making section makes the linking information, displays information regarding to the service symbol information selected from among the service symbol information displayed on the service display section and the logic symbol information selected from among the logic symbol information displayed on the logic information display section.

This makes it possible for the user to easily know the selection results of the service symbol information and the logic symbol information.

In another aspect, the present invention provides a recording medium in which a program is recorded for making a computer execute: a service information obtaining step of obtaining, via a network, information relating to respective services of performing a series of processing with respect to document data; a service display step of displaying service symbol information expressing the respective services based on the information relating to the respective services obtained by the service information obtaining step; and a linking information making step of making a series of linking information that logically links the respective services by using service symbol information selected from among the displayed service symbol information expressing the respective services.

By making the computer execute the program recorded in this recording medium, the user can ascertain available services by the displayed service symbol information and selects such displayed service symbol information to thereby easily make a series of linking information that logically links the desired services. Further, even when the services constructing the workflow are changed or added, it is possible to easily produce a workflow corresponding to the changed or added services.

In yet another aspect, the present invention provides a recording medium in which a program is recorded for making a computer execute: a service information obtaining step of obtaining, via a network, information relating to respective services of performing a series of processing with respect to document data; a service display step of displaying service symbol information expressing the respective services based on the information relating to the respective services obtained by the service information obtaining step, and logic symbol information expressing logic information which logically links the respective services; and a linking information making step of making a series of linking information that logically links the respective services by using service symbol information selected from among the displayed service symbol information expressing the respective services and logic symbol information selected from among the displayed logic symbol information expressing the logic information that logically links the respective services.

By making the computer execute the program recorded in the recording medium, it is possible to easily make a series of linking information that links the desired available services in a desired linking pattern.

Here, the recording medium may be a CD-ROM, a DVD-disk, a magneto-optical disk, an IC card, a hard disk, or the like and is not restricted to a particular medium.

BRIEF DESCRIPTION OF THE DRAWINGS

FIG. 3 is an illustration showing the construction of I/F information stored in an I/F information registration section;

FIG. 16 is an illustration showing the construction of an instruction sheet made by an instruction making section;

FIG. 21 is an illustration showing a display example of an instruction sheet editor screen according to a second embodiment.

DESCRIPTION OF THE PREFERRED EMBODIMENTS

Hereinafter, the preferred embodiments of the present invention will be described in detail with reference to the drawings.

First Embodiment

Figure 1:
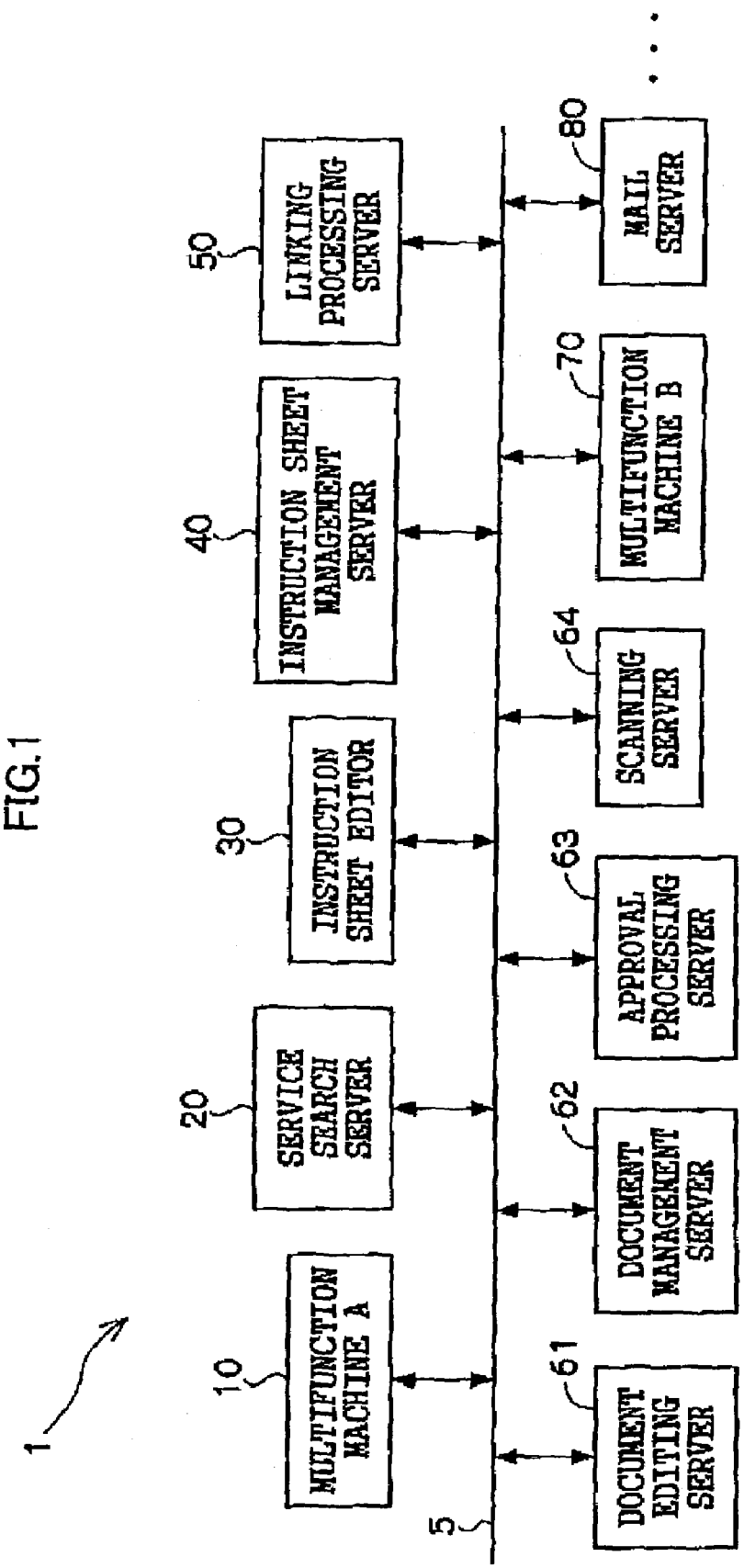
FIG. 1 is a block diagram showing the construction of a document processing system according to a first embodiment of the present invention.

FIG. 1 is a block diagram showing the construction of a document processing system 1 including an instruction sheet editor 30 as a linking information making apparatus according to a first embodiment of the invention.

In the document processing system 1, various kinds of services and applications are connected via a network 5. Here, the services mean available functions relating to documents which can be executed on the request from the outside, and include, for example, copying, printing, scanning, sending or receiving facsimiles, distributing mails, storing or reading information in or from depository, OCR processing, removing noises, electronic approval of documents, and the like.

The document processing system 1, to be more specific, is provided with a plurality of multifunction machines (hereinafter denoted by symbols A and B for differentiation) for performing services of copying, printing, scanning, sending or receiving facsimiles, that is, a multifunction machine A10 and a multifunction machine B70, a service search server 20 for searching services desired by users, an instruction sheet editor 30 that is a client terminal and makes instruction sheets, an instruction sheet management server 40 for managing the instruction sheets, and a linking processing server 50 for executing linking processings of the services according to the instruction sheets.

Further, the document processing system 1 is provided with a document editing server 61 having a document edit function, a document management server 62 for managing documents, an approval processing server 63 having an approval processing function, a scanning server 64 for scanning paper documents, and a mail server 80 for performing a mail service processing.

In this respect, in the present embodiment, while the document processing system 1 has a construction in which a plurality of servers performing predetermined service processings are connected to each other via a network 5, it is not particularly limited to this construction if a plurality of services are connected to each other via the network 5.

Then, the instruction sheet means a file including information expressing the relationship between respective functions and information (interface information) for calling up the respective functions when a series of processings are divided into a plurality of functional processings. Further, the instruction sheet may include information for constructing graphic user interface (GUI) relating to the series of processings. Here, the specific construction of the instruction sheet will be described later.

Further, linking means a relationship between services, for example, the result of a given service determines a service to be invoked thereafter or affects the action of the service to be invoked thereafter, or the result of a given service becomes the input of the following service.

The multifunction machine A10 and the multifunction machine B70 each are one of the service processing sections and perform four service processings of copying, printing, scanning, and sending/receiving facsimiles. Here, in addition to this, the service processing section may be a copier, a facsimile, a server, and a computer for performing a predetermined processing to document data, and is not particularly restricted to these. Further, the multifunction machine A10 and the multifunction machine B70 each have a linking invocation function that, according to the operation of a user, selects an instruction sheet, inputs a parameter, and reflects the parameter inputted to the instruction sheet to request an invocation of a linking processing. Still further, the document editing server 61, the document management server 62, the approval processing server 63, the scanning server 64, and the mail server 80 are also service processing sections, respectively. The detailed function of these servers will be described later.

Figure 2:
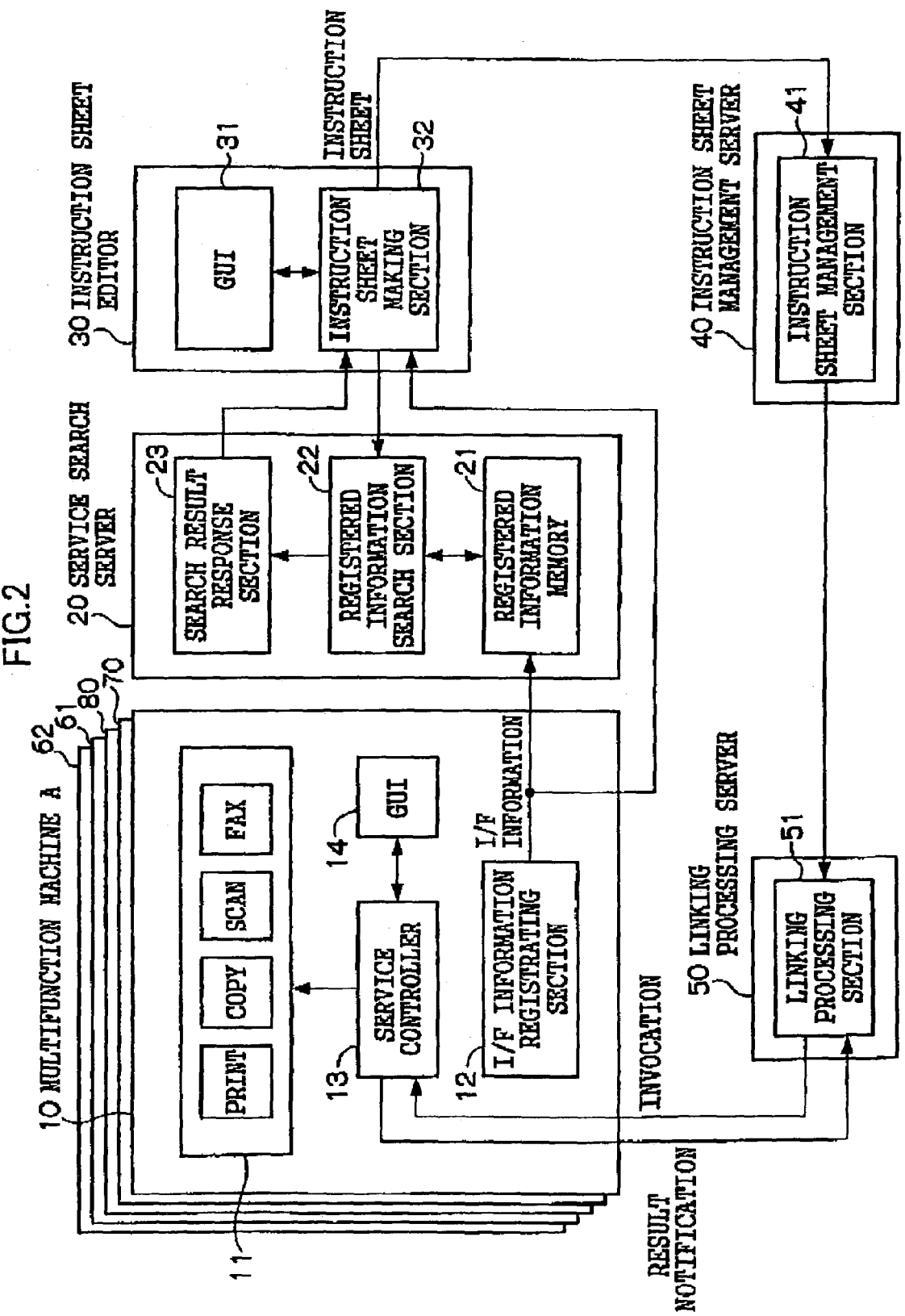
FIG. 2 is a block diagram showing the functional construction of a multifunction machine A, a service search server, an instruction sheet editor, an instruction sheet management server, and a linking processing server, of the document processing system.

FIG. 2 is a block diagram showing the functional construction of the service processing section such as the multifunction machine A10 or the like, the service search server 20, the instruction sheet editor 30, the instruction sheet management server 40, and the linking processing server 50, of the document processing system 1.

The multifunction machine A10 includes a service providing section 11 for performing service processings of copying, printing, scanning and sending/receiving facsimiles, an I/F information registrating section 12 for storing I/F information and registrating it in the service search server 20, a service controller 13 for controlling the service providing section 11, and a graphic user interface (GUI) 14 that is constructed by a touch panel and buttons, for example, and displays the instruction sheets and the like and performs predetermined operations. Here, also the multifunction machine B70 has the same construction as the multifunction machine A10.

FIG. 3 is an illustration showing the construction of the I/F information stored in the I/F information registrating section 12 of the multifunction machine A10. The I/F information corresponds to information relating to the services of the invention, and is constructed by "service class", "service name", "service icon", "service location information", "input", "output", "parameter restriction rules", "service location", "method name", "invocation scheme", and "implicit element".

The "service class" declares the class of a service provided by the multifunction machine A10 of the service processing section. Here, the "service class" uses the ones previously defined and corresponds to, for example, scanning, printing, and the like.

The "service name" declares the name of the service provided by the multifunction machine A10 of the service processing section. The "service icon" is the information which will be used to display an icon on the GUI of the instruction sheet editor 30.

The "service location information" declares a URL used when the service search server 20 obtains the I/F information. The "input" declares the information of the number of data and the type of data inputted to the service. The "outputs declares the information of the number of data and the type of data outputted from the service.

The "service location" declares position information where the service is actually available. The "method name" declares the method name the service processing provides.

The "invocation scheme" declares a scheme for calling up and invoking the service processing. In this respect, for example, SOAP (Simple Object Access Protocol), SMTP (Simple Mail Transfer Protocol), which are protocols used for exchanging a message, and the like can be used as the "invocation scheme".

The "implicit elements" declares data that is not data explicitly transferred as an input to the following processing but can be referred to in the following processing. Here, servers and the other service processing sections also have I/F information similar to that shown in FIG. 3.

The I/F information registrating section 12 registers part of the I/F information constructed in the manner described above in the service search server 20 and, according to a request from the instruction sheet editor 30, sends the I/F information to the instruction sheet editor 30.

The service controller 13 displays, on a GUI 14, a list of the instruction sheets sent from the instruction sheet management server 40 via the linking processing server 50. Further, when an instruction sheet is selected and then a parameter is inputted if necessary, via the GUI 14, the service controller 13 reflects the contents thereof to the instruction sheet and makes the service providing section 11 execute a processing capable of being executed among them. When the service providing section 11 finishes executing the processing, the service controller 13 sends the execution result of the processing and the instruction sheet to the linking processing server 50.

The service search server 20 searches a desired service among the registered I/F information according to a request from the instruction sheet editor 30. The service search server 20, to be more specific, as shown in FIG. 2, includes an registered information memory 21 for storing the I/F information registered by the service processing sections such as the multifunction machine A10 and the like, an registered information search section 22 for searching a service according to a request from the instruction sheet editor 30 by using information registered in the registered information memory 21, and a search result response section 23 that makes and sends a list of services (service list) obtained by a search processing thereby to respond to the request from the instruction sheet editor 30.

In the present embodiment, the I/F information relating to the services is registered in the registered information memory 21 by the service processing sections such as the multifunction machine A10 and the like, but it is also recommended that the services of the service processing sections distributed on a network be searched and that the I/F information relating to the services be collected. Further, it is also recommended that the I/F information registrating section 12 provided in the multifunction machine A10 in the present embodiment be able to be searched by the registered information memory 21 of the aforementioned service search server 20 and that the I/F information be able to be outputted to the registered information memory 21. This construction enables the service search server 20 to search various kinds of services distributed on the network, to collect the I/F information, and to manage them, and allows users to utilize not only information voluntarily registered by the service processing sections but also information collected by the service search server 20.

The instruction sheet editor 30 is also a client terminal and has an instruction sheet making function. The instruction sheet editor 30, to be more specific, as shown in FIG. 2, has a GUI 31 as a display unit and an instruction sheet making section 32 constructed by a microcomputer.

The GUI 31 is used when the user searches a desired service or services and makes a workflow. Further, the GUI 31 displays the content of a service list from the service search server 20, a method or methods of utilizing the respective service, and linking processing pattern information kept by the instruction sheet editor 30. Still further, the GUI 31 is also used as a client terminal when predetermined parameters and the like are inputted.

In the present embodiment, when the user searches a desired service, the GUI 31 obtains the search result of the service search server 20, but it is also recommended that the GUI 31 itself inquire of the service processing sections distributed on the network thereby to get the I/F information of the respective services. This construction makes it possible to eliminate the service search server 20.

The instruction sheet making section 32 obtains a service list showing the outline of available services from the service search server 20 and the I/F information showing a method of utilizing the services from the respective service processing sections by using the service location information of the respective service processing sections described in the service list. The instruction sheet making section 32 displays a service pane 101 and a property pane 104 in the GUI 31 based on the information obtained. Further, the instruction sheet making section 32 makes an instruction sheet in which contents to be displayed when used, input parameters, and instructions (workflow) for utilizing and linking the respective services are defined according to the operation of the GUI 31 by the user and outputs the created instruction sheet as a file in an XML format.

The instruction sheet management server 40 has an instruction sheet management section 41 for managing the instruction sheets. The instruction sheet management section 41 keeps the instruction sheet sent from the instruction sheet editor 30 and sends the instruction sheet in response to a request from the multifunction machine A10 and the linking processing server 50.

The linking processing server 50 has a linking processing section 51 for interpreting and executing a specified instruction sheet. When the instruction sheet is sent, the linking processing section 51 interprets the instruction sheet and, according to a workflow described in the instruction sheet, calls up the referenced service processing section, the document editing server 61, the document management server 62, the approval processing server 63, and the like, and executes a linking processing. Further, the linking processing server 50 stores information of the conditions of the linking processing being now executed and results of the linking processing having been executed and sends the conditions and results of the linking processing at a request of the outside.

The document editing server 61 executes an OCR function and performs various kinds of image processings at a request from the linking processing server 50. Further, when the document editing server 61 is invoked, it informs the service search server 20 of part of the I/F information utilized in the search service. Still further, the document editing server 61 sends the I/F information showing a method of utilizing the document edit service at a request of the instruction sheet editor 30.

The document management server 62 executes a storage processing of the inputted document data and executes the search processing and reading processing of the stored document date at a request of the linking processing server 50. Further, when the document management server 62 is invoked, it informs the service search server 20 of part of the I/F information utilized in the search service. Still further, the document management server 62 sends the I/F information showing a method of utilizing a document management service at a request of the instruction sheet editor 30.

The approval processing server 63 informs the user set as an approver at a request of the linking processing server 50, and the approver accesses the approval processing server 63 which displays an approval screen and executes an approval processing according to the operation of the approval screen. Further, when the approval processing server 63 is invoked, it informs the service search server 20 of part of the I/F information utilized in the search service Still further, the approval processing server 63 sends the I/F information showing a method of utilizing the approval processing service at a request of the instruction sheet editor 30.

The scanning server 64 has functions of scanning paper documents to make scan data, sending the scan data to an arbitrary address via a mail server 80 (which will be described later) in attachment to an electronic mail, and storing the scan data in an arbitrary location. Here, the scanning server 64 performs an instruction of bringing the scanner (not shown) into a standby state at a request of the linking processing server 50 and waits for the user to perform the scan processing. Further, when the scanning server 64 is invoked, it informs the service search server 20 of part of the I/F information utilized in the search service. Still further, the scanning server 64 sends the I/F information showing a method of utilizing a scan processing service at a request of the instruction sheet editor 30.

The mail server 80 executes a mail distribution service function. The mail server 80 executes the mail distribution service function in response to a request from the linking processing server 50 based on a document that is included in the request and is to be processed and information of a destination to which a mail is sent. Further, when the mail server 80 is invoked, it informs the service search server 20 of part of the I/F information utilized in the search service. Still further, the mail server 80 sends the I/F information showing a method of utilizing a mail distribution service at a request of the instruction sheet editor 30.

The document processing system 1 constructed in the aforementioned manner operates in the following manner when the document editing server 61, the document management server 62, the approval processing server 63, and the like have application programs for executing the respective services installed.

After the document editing server 61, the document management server 62, the approval processing server 63, and the like have the respective application programs installed, they inform the service search server 20 of information showing the outlines of the respective services and addresses, to be more specific, part of the I/F information (for example, "service class", "service name", "service location information", "input", and "output"). In addition, it may inform the service search server 20 of all of the I/F information.

The registered information memory 21 of the service search server 20 stores information sent from the document editing server 61, the document management server 62, and the approval processing server 63, and the like.

Instruction Sheet Making Processing

The instruction sheet editor 30, according to the operation of the user, makes an instruction sheet in which linking of services is defined. To be more specific, when the user starts an operation to define linking of services via the GUI 31, the instruction sheet making section 32 of the instruction sheet editor 30 requests a service list showing available services to the service search server 20. Then, when a service list showing the search results and service location information are sent to the instruction sheet making section 32 from the service search server 20, the instruction sheet making section 32 displays the respective services of the service list as icons on the GUI 31.

Further, the instruction sheet making section 32 obtains the I/F information directly from the service processing sections by using the service location information sent together with the service list. In this respect, when the service search server 20 keeps the I/F information of all the service processing sections, it is also recommended that the instruction sheet making section 32 request the I/F information stored by the service search server 20 and keep the results.

When the user defines the linking of services via the GUI 31, the instruction sheet making section 32 saves an instruction sheet showing information of the flow of linking, GUI display information at the time of invocation of linking and during linking, and the I/F information relating to the respective services in files in the XML format. Then, the instruction sheet making section 32 sends the made instruction sheet to the instruction sheet management server 40.

The instruction sheet management section 41 of the instruction sheet management server 40 stores the instruction sheet sent from the instruction sheet editor 30.

A flow of an instruction sheet making processing in the instruction sheet editor 30 will be described in more detail by using a flow chart showing a program of an instruction sheet making processing routine in the instruction sheet editor 30 as a method of making an instruction sheet shown in FIG. 4 and screen display examples shown in FIG. 5 to FIG. 15. The program of the instruction sheet making processing routine is recorded in a ROM (not shown) in the aforementioned microcomputer of the instruction sheet editor 30. Here, a recording medium for recording the program of the instruction sheet making processing routine is not restricted to the ROM but may be a CD-ROM, a DVD disk, a magneto-optic disk, an IC card, a hard disk or the like, or a transmission medium like a carrier wave on an electric communications line and thus is not restricted to a special recording medium.

Here, an example of making an instruction sheet will be described in which an image file inputted from the facsimile is processed by an OCR to create a text file, the text file is related with the image file, and the text file or the image file is mailed, printed, or stored.

When the user presses a start button (not shown), the program of the instruction sheet making processing routine is read from the ROM by the instruction sheet editor 30 and is executed. First, at step 200 in FIG. 4, an instruction sheet editor screen is displayed on the GUI 31.

Figure 5:
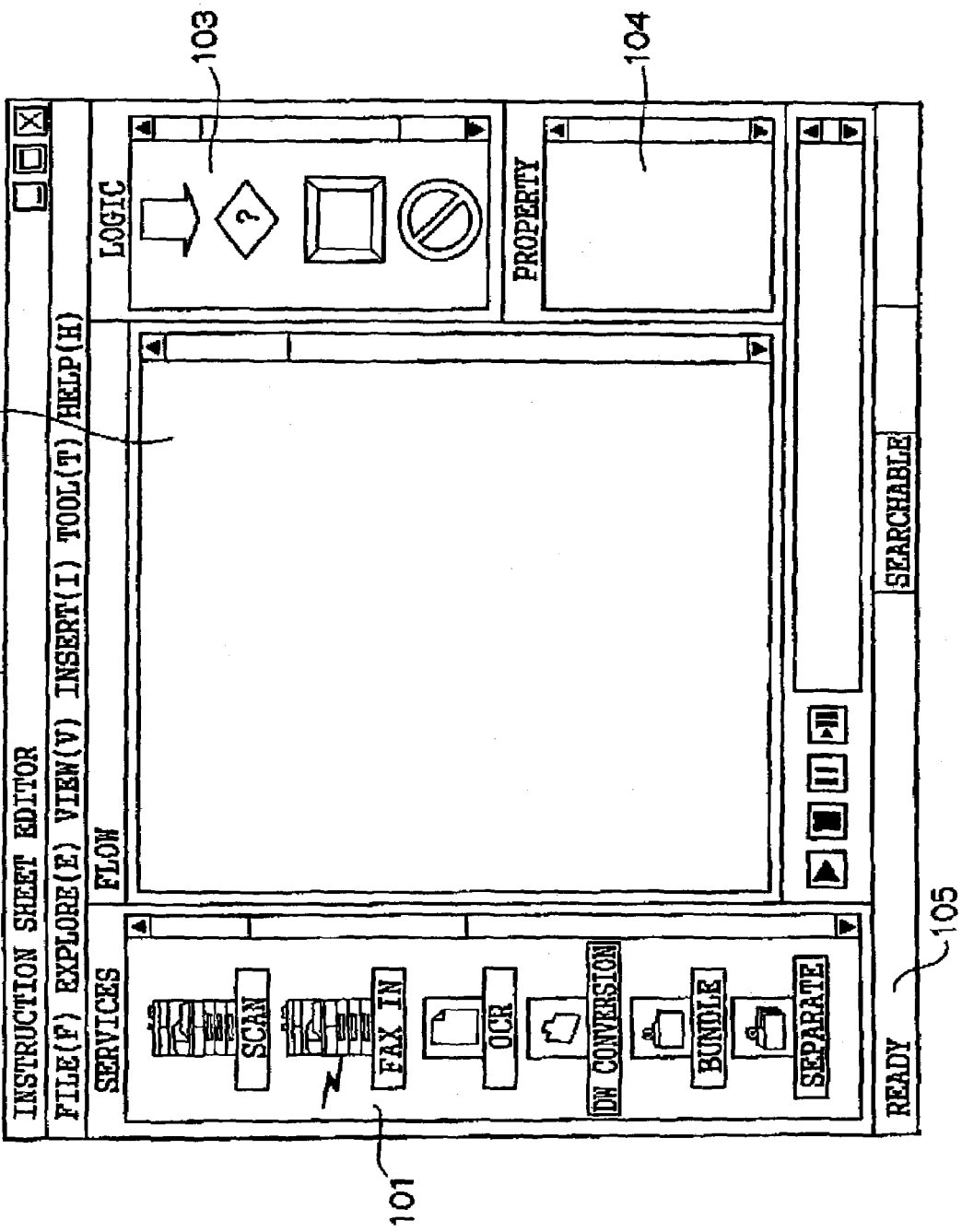
FIG. 5 is an illustration showing an instruction sheet editor screen displayed on a GUI of the instruction sheet editor.

FIG. 5 is an illustration showing an instruction sheet editor screen 100 displayed on the GUI 31 of the instruction sheet editor 30. The instruction sheet editor screen 100 includes a service pane 101, a flow pane 102, a logic pane 103, a property pane 104, and a message display area 105.

Icons expressing various kinds of services of the respective service processing sections (service icons) are displayed in the service pane 101. Here, only the icons expressing services included in the service list received from the service search server 20 are displayed in the service pane 101 based on the "service icon" information included in the I/F information.

Icons expressing a linking processing pattern for linking services by logic (logic icons) are displayed in the logic pane 103. For example, in the drawing, an icon of an arrow directing downward expresses a pattern of transition, a rhombic icon expresses a pattern of branch, a rectangular icon expresses a pattern of iteration, and a stop mark icon expresses the termination of the workflow processing.

The detailed setting parameters of the respective icons displayed in the service pane 101 and the logic pane 103 are displayed in the property pane 104 and the setting parameters are inputted by the user.

Various kinds of error messages and the like are displayed in the message display area 105.

At step 202, it is determined whether or not the icons displayed in the service pane 101 or the logic pane 103 of the instruction sheet editor screen 100 are selected by the user's operation of the mouse, and the icons are dragged to and dropped in the flow pane 102. In a case where it is determined that any one icon is selected, dragged to and dropped in the flow pane 102, the processing proceeds to step 204. In this example, first, an icon "Fax In" expressing a facsimile input service displayed in the service pane 101 is selected and is dragged to and dropped in the flow pane 102.

At step 204, if the icon dragged to and dropped in the flow pane 102 is a service icon, it is checked whether the type of data and the number of data shown by the input information of the I/F information of the service shown by the service icon are identical to the type of data and the number of data shown by the output information of I/F information of the service shown by the service icon dragged and dropped before the service icon prior to the service icon. If they are not identical, it is determined at step 206 that a state of linking is erroneous and a warning message is displayed in the message display area 105 and the arrangement of the icon in the flow pane 102 is rejected. Further, also when not a service icon but a logic icon is dragged and dropped to the top of the flow or when the logic icons are continuously dragged and dropped and a service icon is not arranged between the logic icons, it is determined that the state of linking of flow is erroneous and a warning message is displayed.

The user can recognize that the state of linking is erroneous from the displayed warning message and thus can again select a proper icon. In the case of this example, the service expressed by the dragged and dropped "Fax In" icon is a service first executed in the workflow and has consistency both in the input/output data type and in the flow. Then, it is determined that the state of linking is correct and thus a warning message is not displayed and the icon is arranged in the flow pane 102.

Figure 6:
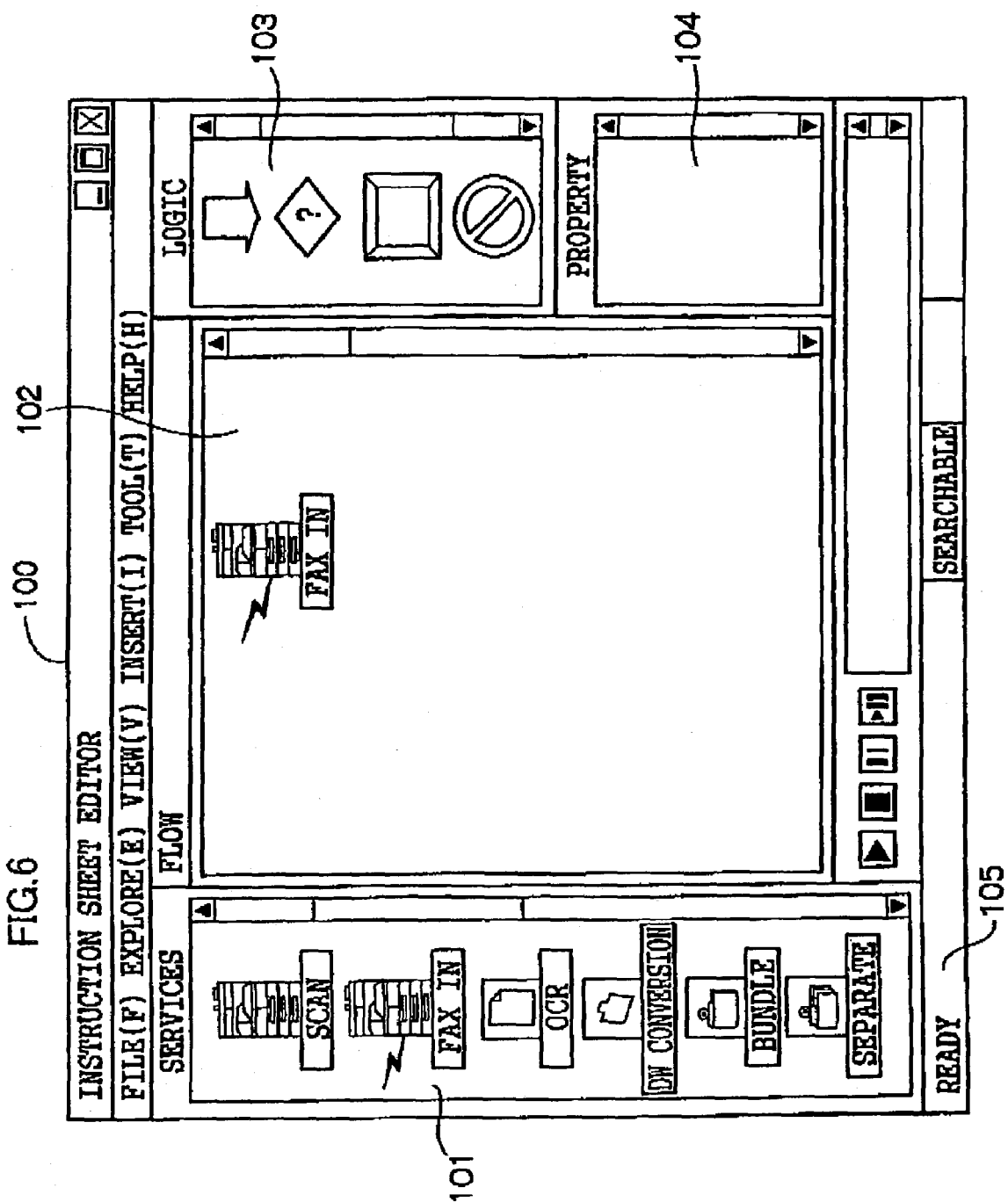
FIG. 6 is an illustration showing a state where a "Fax In" service icon is dragged to and dropped in a flow pane.

FIG. 6 is an illustration showing a state where the service icon of "Fax In" is dragged to and dropped and arranged in the flow pane 102.

When the service icon is arranged in the flow pane 102, at step 210, the property of the service of the icon is displayed in a property pane 104. The property is information for defining the property of each service in more detail and its content varies depending on the service. Here, a state of the default setting of the property is displayed in the property pane 104, or nothing is displayed therein depending on the kind of property and only setting item names are displayed therein. The user checks the state of a setting displayed in the property pane 104 and can make a change of setting.

Figure 7:
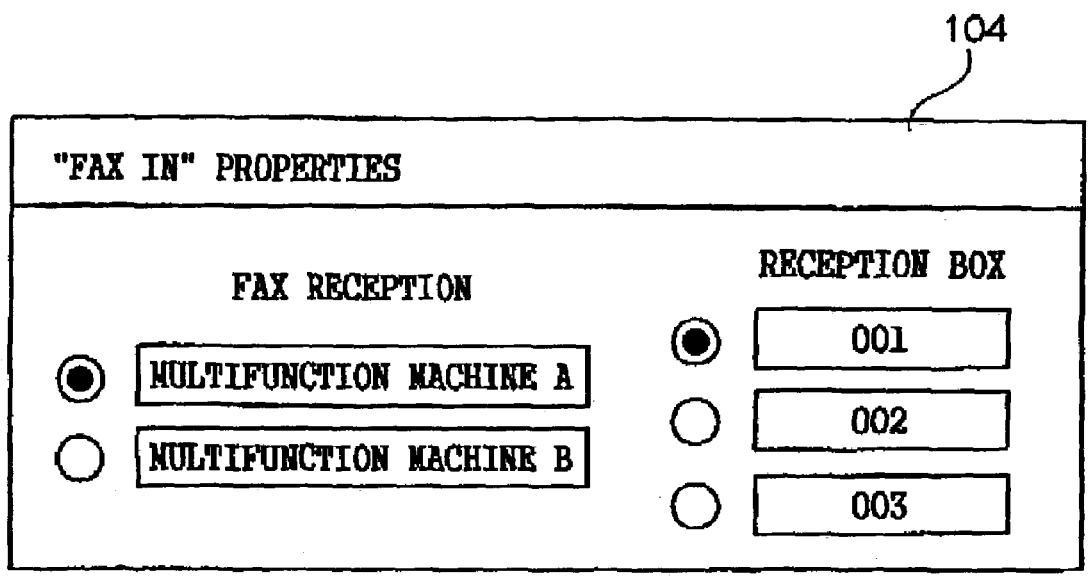
FIG. 7 is an illustration showing a display example when the property of the service icon of the facsimile input service is displayed in a property pane.

FIG. 7 shows a display example when the property of the "Fax In" service icon is displayed in the property pane 104. As shown in the drawing, a list of the service processing sections (multifunction machine A and multifunction machine B) capable of receiving a facsimile is displayed on the left of the property pane 104. Radio buttons are displayed on the left of the list of the service processing sections and the user can freely select the service processing section that the user desires to execute a facsimile input service.

Here, it is also recommended that all the service processing sections capable of executing the facsimile input service in the network 5 be displayed in the property pane 104 based on the service list and the I/F information obtained from the service search server 20, or that only the service processing section arranged in an area close to the instruction sheet making editor 30 operated by the user be displayed in the property pane 104. Further, it is also recommended that respective icons expressing the facsimile input service of the multifunction machine A10 and the multifunction machine B70 be displayed in the service pane 101.

Further, the number of a receiving box that is a memory region for receiving a facsimile is displayed on the right in the drawing. The receiving box can be also selected, as is the case with the aforementioned service processing section.

Incidentally, in FIG. 7, the radio buttons are displayed in a state where an item of default is checked.

At step 212, it is determined whether the property has been inputted or not. In a case where it is determined that the property is inputted, the property is set based on the input at step 214. In a case where it is determined that the property is not inputted, the displayed default setting is used for executing the service as it is.

At step 216, it is determined whether registration is instructed or not. In a case where it is determined that the registration is not instructed, the processings following step 202 are iterated.

Figure 8:
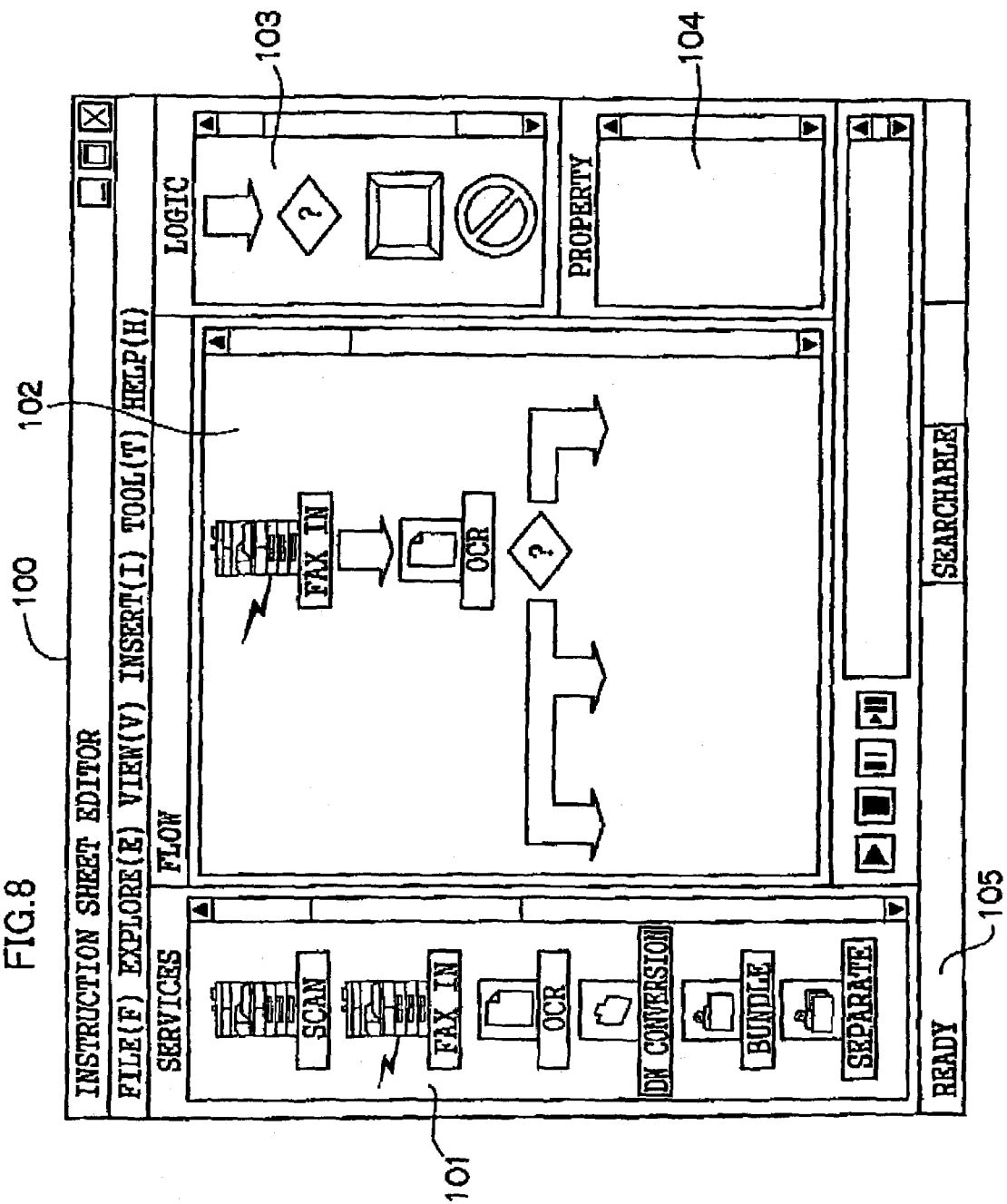
FIG. 8 is an illustration showing an instruction sheet editor screen in a state where following the service icon of the facsimile input service, a logic icon of transition, a service icon of OCR service, and a logic icon of branch are dragged to and dropped in the flow pane.

FIG. 8 shows the instruction sheet editor screen 100 in a state where, following the "Fax in" service icon, the logic icon of transition, the service icon of OCR service, and the logic icon of branch are dragged to and dropped in the flow pane 102 by the iteration of the processings from step 202 to step 216. The respective icons are checked for consistency in the input/output data and in the flow at step 204. Further, when the respective icons are dragged and dropped and are made sure for consistency, at step 210, their properties are displayed in the property pane 104 as is the case with the property of the aforementioned facsimile input service.

Figure 9:
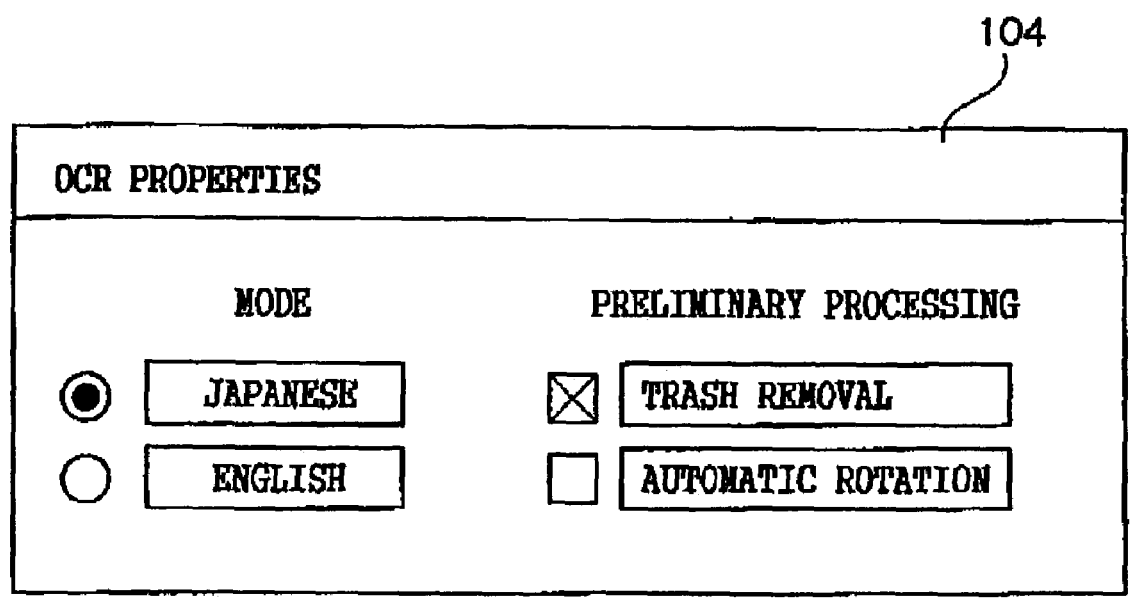
FIG. 9 is an illustration showing a display example of a property pane of the service icon of OCR service.

FIG. 9 shows a display example of the property pane 104 of the OCR service icon. As shown in the drawing, reading modes at the time of the OCR service execution are displayed on the left and items of preliminary processings to be executed are displayed on the right. Radio buttons are provided for the reading modes and one reading mode can be selected, and check boxes are provided for the preliminary processings and a plurality of items can be selected.

Further, although not shown, when a plurality of service processing sections capable of executing the OCR service are on the network 5, it is also recommended that those service processing sections be displayed and that the user can select the service processing section that the user desires to execute the service as is the case with the property of the aforementioned facsimile input service. In the present embodiment, the document editing server 61 executes the OCR service.

Figure 10:
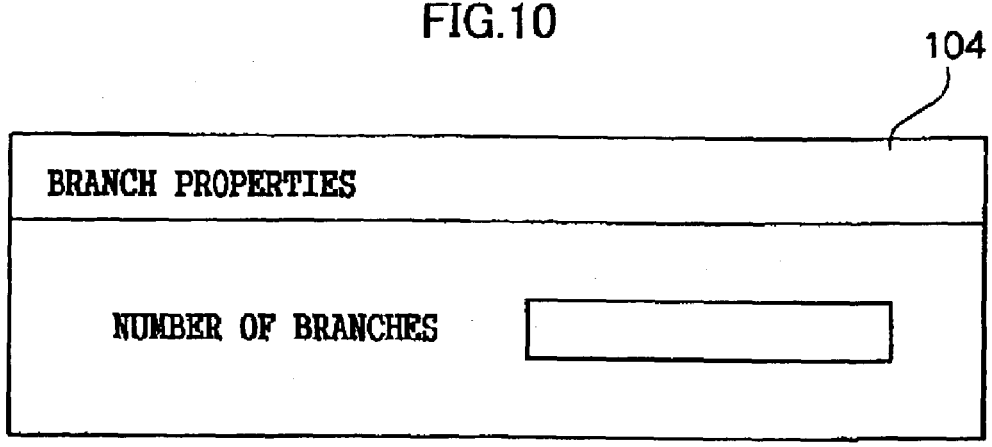
FIG. 10 is an illustration showing a display example of a property pane for setting the number of branches for the logic icon of branch.
Figure 11:
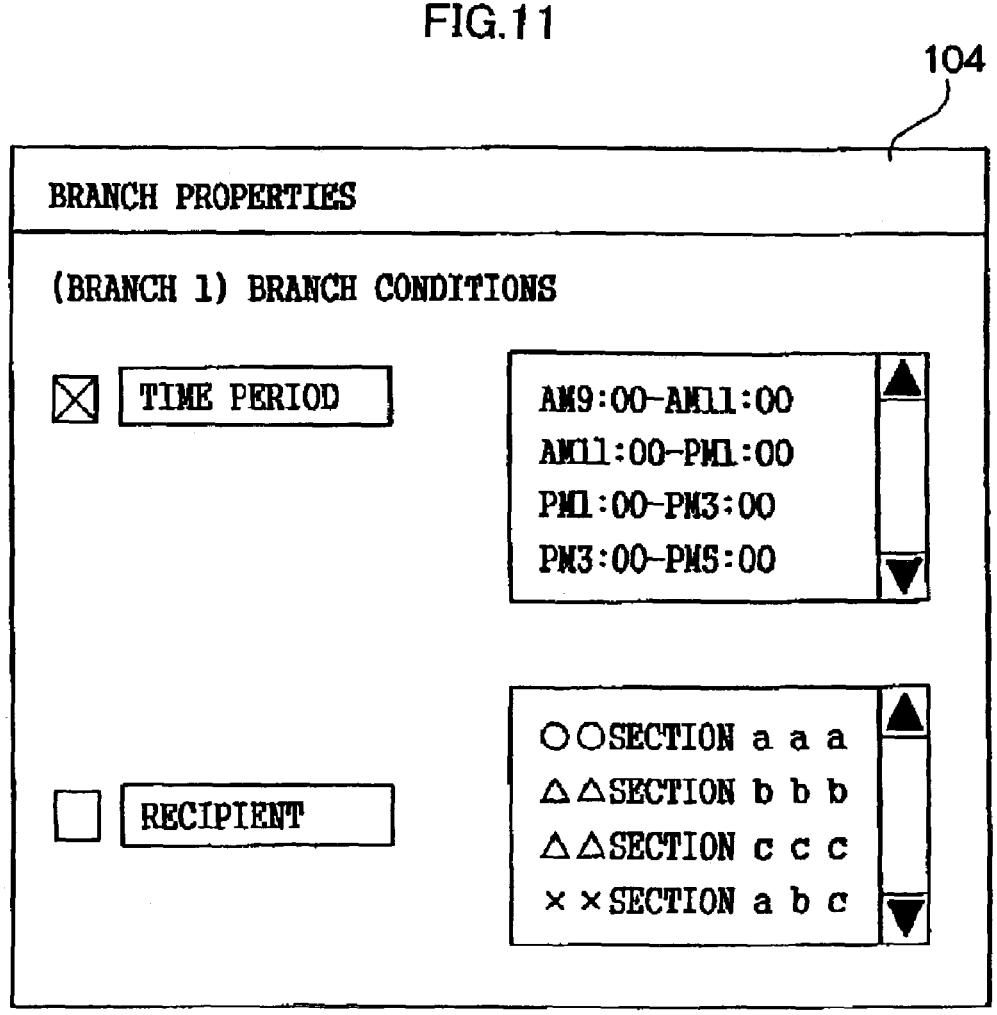
FIG. 11 is an illustration showing a display example of a property pane for setting the branching conditions for the logic icon of branch.

FIG. 10 shows a display example of the property pane 104 for the logic icon of branch. As for the logic icon of branch, the number of branches can be set. When the number of branches is set, as many logic icons of transition as the number of branches are automatically displayed below the rhombic logic icon of branch in the flow pane 102. Further, the conditions of branch as shown in FIG. 11 can be set for each of a set number of branches in the property pane 104. Here, a time zone when data is inputted and a receiver can be set as the conditions of branch. Further, it is also recommended that a day of the week and a time be set as the conditions of branch and that information associated with the document to be processed such as approval/not-yet approval of the document, maker of the document, and the like be set as the conditions of branch.

Figure 12:
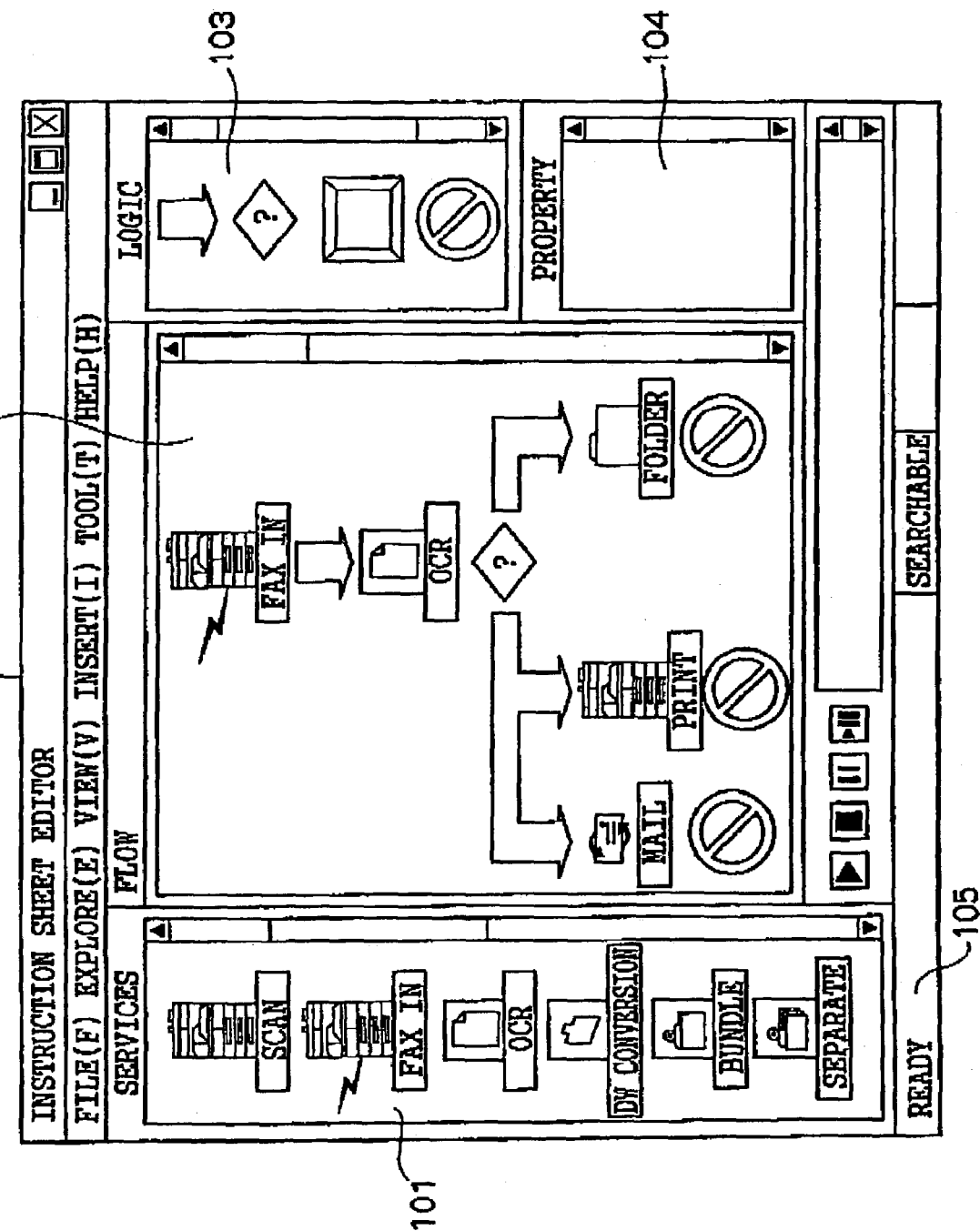
FIG. 12 is an illustration showing an instruction sheet editor screen in a state where an icon of mail service, an icon of print service, an icon of storage service are dragged to and dropped below the respective branches, and further logic icons of termination are dragged to and dropped below the respective icons.

FIG. 12 shows the instruction sheet editor screen 100 in a state where following the logic icon of branch, by iterating the processings from step 202 to step 216, an icon of mail service, an icon of print service, and an icon of storage service are dragged and dropped below each branch and further logic icons of termination are dragged and dropped below the respective icons.

Figure 13:
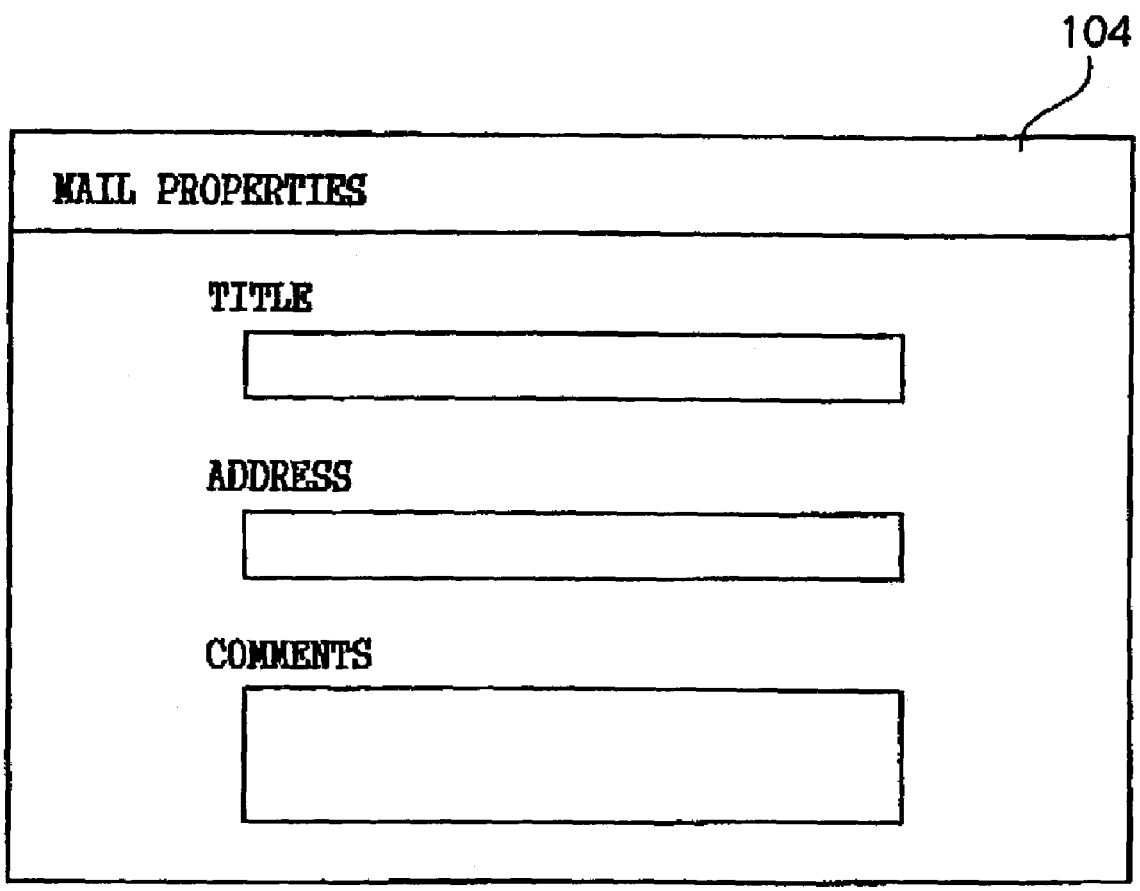
FIG. 13 is an illustration showing a display example of a property pane for the service icon of mail service.

FIG. 13 shows a display example of the property pane 104 for the service icon of mail service.

As shown in the drawing, the user can arbitrarily input and set the title, address, and comments of the mail.

Incidentally, in the present embodiment, the mail server 80 executes the mail service.

Figure 14:
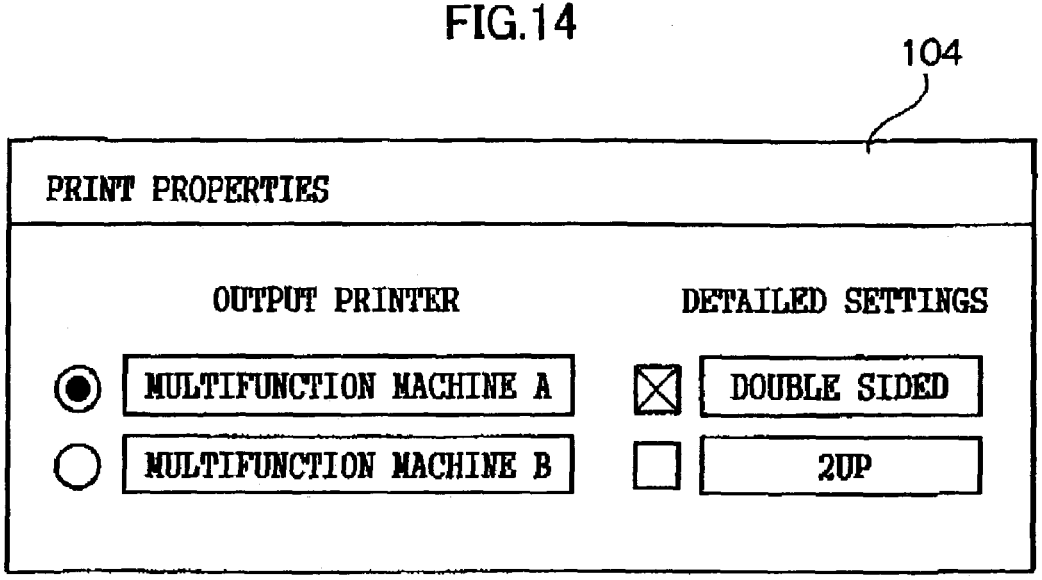
FIG. 14 is an illustration showing a display example of a property pane for the service icon of print service.

Further, FIG. 14 shows a display example of the property pane 104 for the service icon of print service.

As shown in the drawing, a list of service processing sections (multifunction machine A and multifunction machine B) capable of executing the print service is displayed on the left and the service processing section to execute the print processing can be set by checking a radio button. Further, items of processings to be executed when the print processing is executed are displayed on the right, and a necessary processing can be set by checking a check box.

In the present embodiment, the multifunction machine B70 executes the print service.

Figure 15:
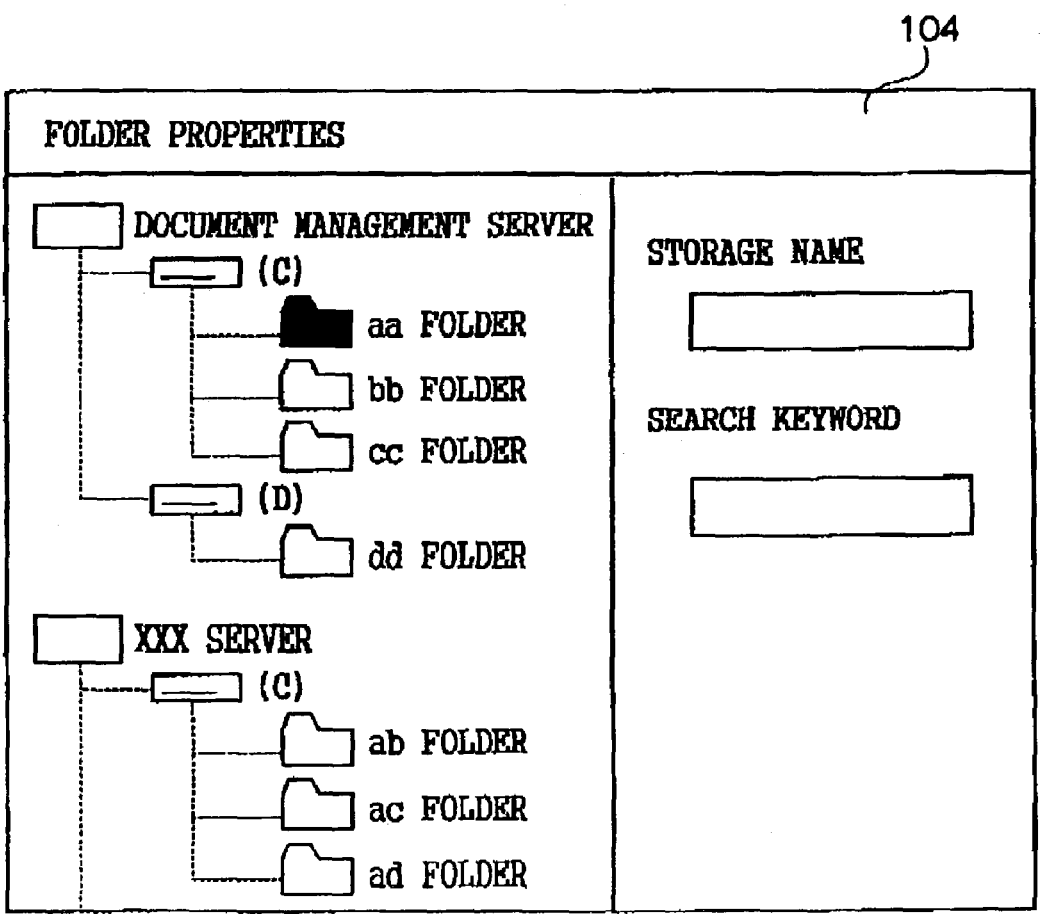
FIG. 15 is an illustration showing a display example of a property pane for the service icon of storage service.

Further, FIG. 15 shows a display example of the property pane 104 for the service icon of storage service.

As shown in the drawing, a list of folders capable of storing is displayed on the left and a folder where the document is to be stored can be selected, and a storage name and a search keyword can be inputted to the right.

In the present embodiment, the document management server 62 executes the storage service.

Further, in the present embodiment, from the result of the OCR processing, a position in the document where a receiver is mentioned is found and read out and any one services of mail, print, and storage is set for execution according to the read receiver.

Figure 4:
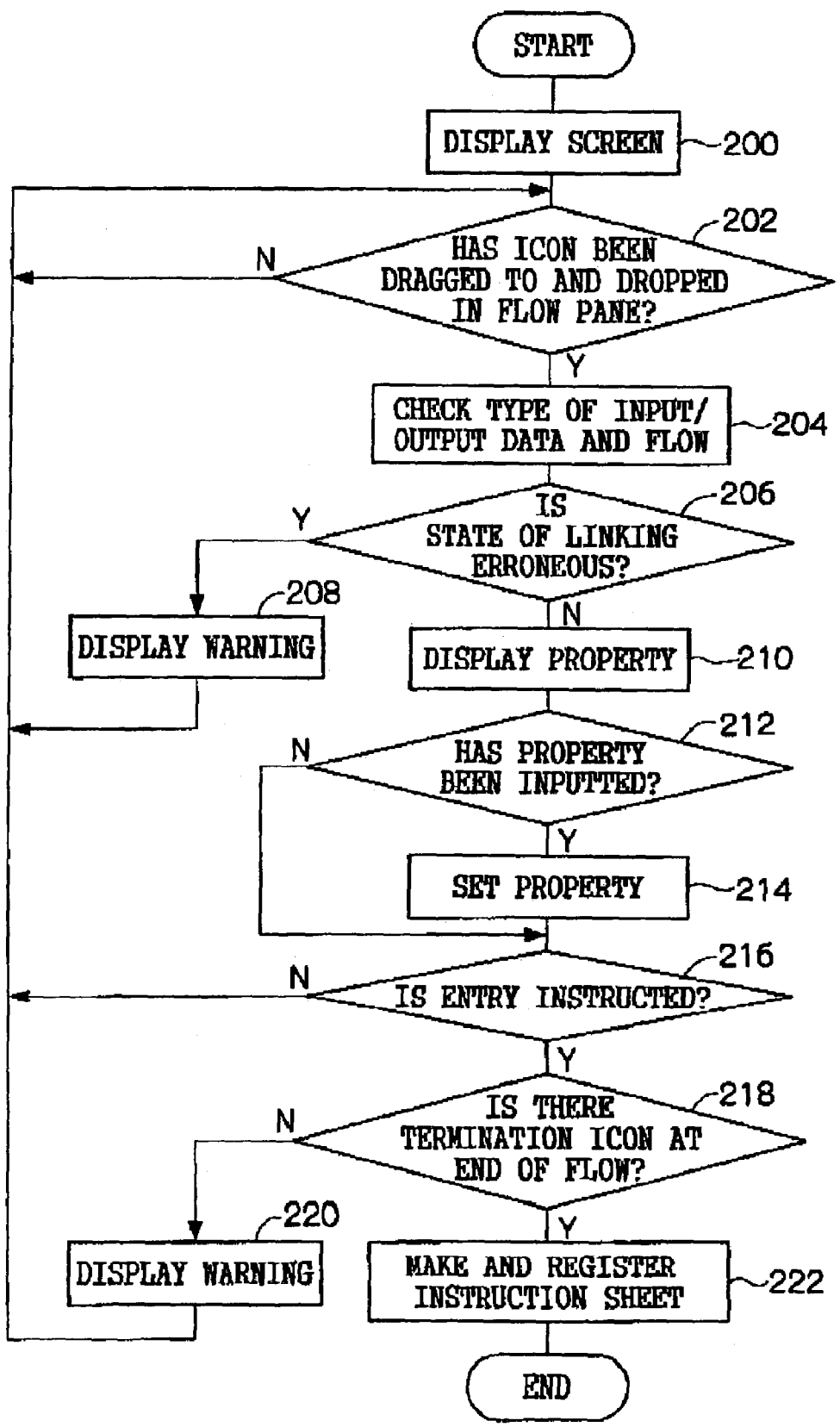
FIG. 4 is a flow chart showing a flow of an instruction sheet making processing routine in the instruction sheet editor.

All the icons necessary for processings are dragged and dropped and their properties are set in this manner, and then it is determined whether or not registration is instructed by the user at step 216 in FIG. 4. In a case where it is determined that the registration is instructed, it is determined at step 218 whether there is a termination logic icon is at the end of the flow in the flow pane 102. In a case where it is determined that there is not a termination logic icon, because selection of the icon by the user is not yet completed, a warning message is displayed.

The user can recognize that the selection of the icon is not completed by the displayed warning message and can again select a suitable icon, for example, drag and drop a necessary service icon or a termination logic icon for terminating a processing.

In a case where it is determined at step 218 that there is the termination logic icon, services are linked and an instruction sheet made based on the flow of the icon formed on the flow pane 102 by the instruction sheet making section 32 at step 222. Here, the made instruction sheet is given an arbitrary registration name expressing an arbitrary service linking processing and an arbitrary file name by the user and is registered. The file name of the instruction sheet made in this example is "distribution of document received by FAX".

The instruction sheet editor 30 makes an instruction sheet saved in a file in the XML format according to the processing described above and sends the made instruction sheet to the instruction sheet management server 40.

Further, following step 222 in FIG. 4, after the instruction sheet is made by the instruction making section 32, as step 224, the made instruction sheet can be edited by using the instruction sheet editor screen 100. To be more specific, the instruction sheet that was made in the past is called up from the instruction sheet management server 40 and edit of adding, changing, and so forth of icons is performed by using the instruction sheet editor screen 100.

FIG. 16 is an illustration showing the construction of an instruction sheet made by the instruction sheet making section 32. The instruction sheet has a "flow" in addition to the construction of the I/F information shown in FIG. 3.

The "flow" means elements of describing the linking between the services and includes the elements of "invoke", "if" used for performing control structure and logic operation or arithmetic operation, and so forth.

Here, the element of "invoke" expresses a specific method of the service processing section and calls up a service. The element of "invoke" includes a "map" for expressing the mapping information of parameters and a "method" for expressing a method name to be called up. The elements of "if", "and", "eq", and "gt" express control structure and logic operation, and execute conditional branching, adjusting parameters passed between the services, and the like at the time of performing the linking processing.

The instruction sheet describes all the information relating to control of the linking processing of the services in the elements of the "flow", whereby also the linking processing itself expressed by the instruction sheet is considered as one service. Thus, the instruction sheet, as described above, includes the same content as the I/F information of the other service processing sections.

Invocation of Coordination Processing

The service processing section of the document processing system 1, for example, the multifunction machine A10 can invoke the linking processing. To be more specific, the service controller 13 of the multifunction machine A10 requests an instruction sheet from the instruction sheet management server 40 according to the operation of the GUI 14 and displays in the GUI 14 a list of instruction sheets sent from the instruction sheet management server 40.

Figure 17:
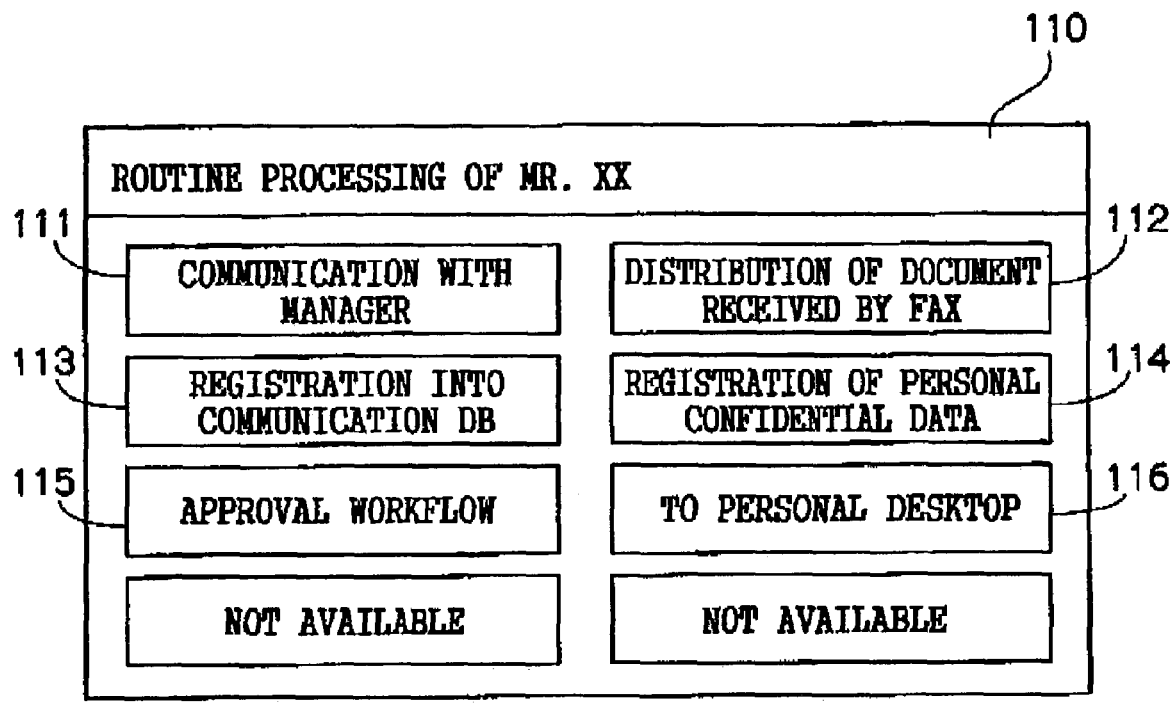
FIG. 17 is an illustration showing an example of an instruction sheet list screen expressing a list of instruction sheets displayed on a GUI.

FIG. 17 is an illustration showing an example of an instruction sheet list screen 110 that expresses a list of instruction sheets displayed on the GUI 14. The instruction sheet list screen 110 has buttons for selecting the instruction sheet to be displayed. For example, the instruction sheet list screen 110 has a "communication with manager" button 111, a "distribution of document received by Fax" button 112, an "registration into communication DB" button 113, an "registration of personnel in confidential data" button 114, an "approval workflow" button 115, and a "to personal desktop" button 116. The user can select one or more instruction sheets from the instruction sheet list screen 110.

Figure 18:
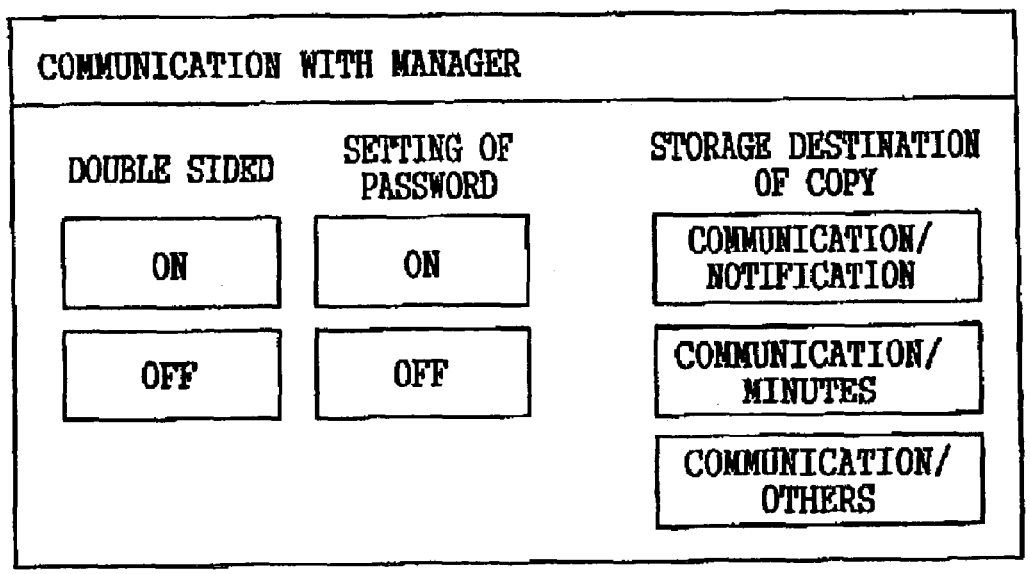
FIG. 18 is an illustration showing an example of an instruction sheet screen displayed when a "Communication with a manager" button is selected.
Figures 19, 20:
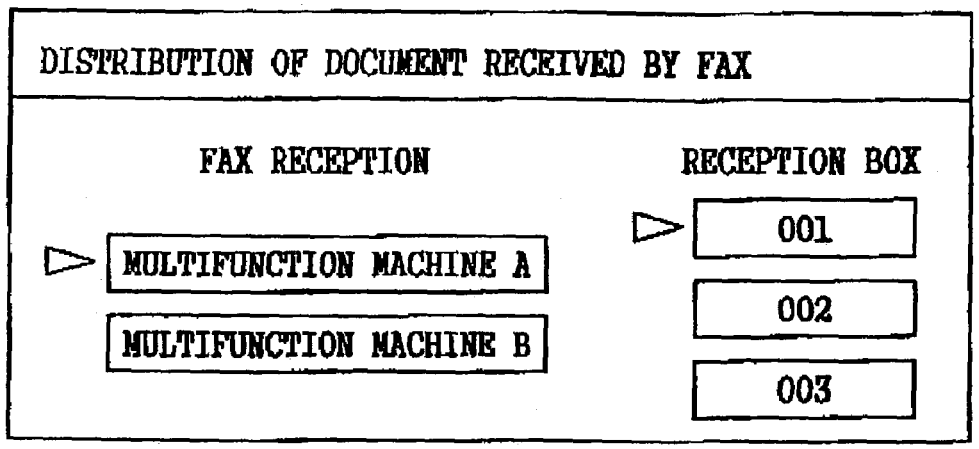
FIG. 19 is an illustration showing an example of an instruction sheet screen displayed when a "Distribution of document received by FAX" button is selected.
FIG. 20 is an illustration showing an example of a processing progress/result screen displayed on the multifunction machine A.

FIG. 18 is an illustration showing an example of the instruction sheet screen displayed when the "communication with manager" button 111 is selected. FIG. 19 is an illustration showing an example of the instruction sheet screen displayed when the "distribution of document received by FAX" button 112 is selected. The parameters set by using the property pane 104 in the instruction sheet making processing described above are displayed in the instruction sheet screen and further parameters necessary at the time of executing the services can be inputted therein. Further, the displayed parameters can be changed.

When the service controller 13 detects that the start button is pressed down via the GUI 14, it invokes the linking processing to control the service providing section 11. At this time, the service controller 13 reflects the parameters inputted via the GUI 14 to the instruction sheet. The service controller 13 analyzes the instruction sheet and determines whether or not the service providing section 11 can execute the first processing instructed by the instruction sheet, and if possible, it executes the processing. Then, the service controller 13 sends the processing result of the service providing section 11 and the instruction sheet to the linking processing server 50.

Here, the service controller 13 can display on the GUI 14 the progress or the result of the invoked linking processing (of not only the device itself but also the other service processing sections). To be more specific, when the service controller 13 receives a request to display the progress or result of the linking processing via the GUI 14, the service controller 13 requests the state of the service processing from the linking processing server 50 and displays the progress and result of the service processing on the GUI 14.

FIG. 20 is an illustration showing an example of a processing progress/result screen 120 displayed on the multifunction machine A10. The processing progress/result screen 120 displays a "processing name" for expressing the instruction sheet, a "starting date and time" for expressing a date and time of the start of execution, and a "status" for expressing the state of execution.

The user can also refer to the progress and result of the aforementioned linking processing by using the instruction sheet editor 30 and the other client terminal (not shown) connected to the network 5. In this case, it is essential only that the respective client terminals request the state of processing from the linking processing server 50 and display the processing result on the GUIs included with the respective client terminals.

Further, in the present embodiment, the flow of the invoked instruction sheet is displayed in the flow pane 102 of the aforementioned instruction sheet editor screen 100 and the progress of the linking processing can be visually grasped. To be more specific, the service icon of the service now being executed flashes on and off. After the execution of the service is completed, the state of flashing is released. When an error occurs during the execution of the service, a mark such as x or the like overlays the icon for display. Here, when the service processing section goes down while it is executing the service and becomes incapable of executing the service, it is also recommended that the mark x be displayed on the icon, that a list of alternative service processing sections capable of providing the same service be displayed in the property pane 104, and that the user be made to select a service processing section thereby to again edit the instruction sheet according to the state of execution. This makes it possible to prevent the processing from being interrupted and to continue performing the processing even if the error occurs during the execution of the service. Here, it is also recommended that a pane in which the progress of the linking processing can be visually grasped be displayed separately from the flow pane 102.

When the linking processing server 50 receives an instruction sheet sent from the multifunction machine A10, it analyzes the content of the instruction sheet and sequentially calls up the service processing sections according to the content described in the instruction sheet and continues performing the linking processing.

According to the instruction sheet of the above-mentioned "distribution of document received by FAX", an image file inputted through the facsimile function of the multifunction machine A10 is processed through the OCR function of the document editing server 61 to create a text file, which is related to the image file. Then, according to the receiver of the facsimile, the text file or the image file is subjected to the mail service by means of the mail server 80, the print service by means of the multifunction machine B, or a storage service by means of the document management server 62.

Search Processing

Here, taking a case where the multifunction machine A10 is newly provided on the network 5 of the document processing system 1 as an example, the detailed processing of the service search server 20 will be described.

The I/F information registrating section 12 of the multifunction machine A10 newly connected to the network 5 sends part of I/F information (for example, "service class", "service name", "service location information", "input", and "output") to the service search server 20 every predetermined time. Here, the I/F information registrating section 12 may send all the I/F information to the service search server 20.

The registered information memory 21 of the service search server 20 sequentially updates and stores the I/F information sent from not only the newly provided multifunction machine A10 but also the other service processing sections. In this manner, even if a breakdown or a change occurs in some service processing section, the registered information memory 21 stores at least the outline and address (URL or path name) of the service for all the service processing sections that are connected to the network 5 and can be used.

When the registered information search section 22 receives a search request of searching a desired service from the instruction sheet editor 30, it performs a search by using the I/F information stored in the registered information memory 21 and searches a now-usable service. Here, as a method of search, the registered information search section 22 may search a service that agrees with the desired service in the "service class" or the "service name", or may search a service that agrees with the desired service in the "input" and the "output" among the information stored in the registered information memory 21.

The search result response section 23 creates a service list expressing a list of services agreeing with the search request of the instruction sheet editor 30 based on the search result of the registered information search section 22 and sends not only the service list but also the service location information of the respective service processing sections to the instruction sheet editor 30. The instruction sheet making section 32 of the instruction sheet editor 30 displays the service list sent from the service search server 20 on the GUI 31.

At this time, the user looks at the service list displayed on the GUI 31 to recognize a service that the user wants to use and can make an instruction sheet that describes a linking processing of the service by using the service included in the service list. The instruction sheet making processing is as having mentioned above.

When the instruction sheet making section 32 makes an instruction sheet, it accesses the multifunction machine A10 to obtain the I/F information by using the service location information of the service selected by the user.

Then, the instruction sheet making section 32 obtains the information of the processing and its input/output information from among the I/F information and makes a workflow while keeping the consistency of the I/F information as described above. In other words, the instruction sheet making section 32 refers to and utilizes the I/F information sent from the service processing sections including the multifunction machines A10 and combines services provided by one or more service processing sections to make desired workflow. Then, the instruction sheet making section 32 converts the made workflow to an instruction sheet that the linking processing server 50 can interpret and registered the instruction sheet in the instruction sheet management server 40.

As described above, the document processing system 1 according to the first embodiment searches now-usable services by the service search server 20 and can make an instruction sheet expressing a workflow by using the I/F information of the service processing section performing the searched service processing based on the operation via GUI 31 by the user, and thus can readily and freely make the instruction sheet even after the system is once constructed.

Further, in the document processing system 1, even if the user does not grasp all the services, the user can search a necessary services and make an instruction sheet, so that it is possible to improve convenience when the user makes a workflow.

Further, in the document processing system 1, even when a breakdown or a change occurs in the service processing section, it is possible to obtain the I/F information from the usable service processing section and to readily make a new instruction sheet. Thus, by making an alternative service processing section execute a predetermined processing, it is possible to avoid a workflow processing from being delayed by the breakdown of a part of the service processing sections.

The registered information memory 21 of the service search server 20 may store only part of the I/F information sent from the service processing section or all the I/F information. Further, the search result response section 23 may send not only part of the I/F information (service location information) of the respective service processing sections but also all the I/F information to the instruction sheet editor 30.

Further, in the present embodiment, the example in which the icons displayed on the service pane 101 are the icons for the respective service classes and in which the setting of a service processing section to execute the service, among the service processing sections to provide the same service on the network 5, is performed by using the property pane 104 has been described. However, it is also recommended that the icons that express the same service content but vary depending on the service processing sections to execute the service be displayed and that the user be made to select the icon. In this case, it is not necessary to set the service processing section by using the property pane 104.

Still further, in this case, it is also recommended that only the icon of the service processing section arranged in the area near the instruction sheet editor 30 operated by the user be displayed in the service pane 101 and the icon of the service processing section arranged at a long distance from the instruction sheet editor 30 be not displayed, and that the size of the icon be varied according to a distance from the instruction editor 30.

Still further, the displayed icon may be formed in such a shape that enables the type of input/output data to be visually grasped. For example, the top of the icon is formed in a convex shape having a feature according to the type of the input data and the bottom of the icon is formed in a concave shape having a feature according to the type of the output data, and thus it is visually shown to the user that only the icons which mesh with each other in the concave and convex shapes can link with each other. This makes it possible to efficiently select the icon and to quickly make the instruction sheet.

Second Embodiment

Next, a second embodiment of the invention will be described.

The instruction sheet editor screen displayed on the GUI 31 of the instruction sheet editor 30 is not limited to the example described in the aforementioned first embodiment but may be the screen shown in FIG. 21.

The instruction sheet editor screen 130 is constructed by a customized menu window 132, a selection result window 134, and a pre-registered JOB window 136.

The customized menu window 132 corresponds to the service pane 101 in the first embodiment and displays icons (service icons) expressing various services of the respective service processing sections.

The selection result window 134 corresponds to the flow pane 102 in the first embodiment and displays the icons sequentially in combination that the user selects from the customized menu window 132 and drags and drops.

The pre-registered JOB window 136 displays buttons showing instruction sheets made and registered in the past and instruction sheet being now made. When the user clicks the button displayed on the pre-registered JOB window 136, the content of the instruction sheet of the clicked button is displayed on the selection result window 134 and the user can freely edit the instruction sheet.

The present instruction sheet editor screen 130 does not have windows corresponding to the logic pane 103 and the property pane 104 in the first embodiment but has a simple construction. When an instruction sheet is newly made, the icons selected from the customized menu window 132 are simply connected in sequence only by the transition logic. Here, the data types of the input/output of the respective icons are checked in the same way as in the first embodiment As described above, also by the instruction sheet editor screen 130 in accordance with the second embodiment, an instruction sheet expressing a workflow can be freely designed and made.

Further, the invention is not limited to the above-mentioned first and second embodiments but allows various modifications in design within the scope claimed in the appended claims.

For example, while the multifunction machine A 10 has the linking invocation function, a predetermined server may have the linking invocation function and a linking invocation device may be arranged on the network 5.

Further, while the instruction sheet editor 30 has a function as a client terminal, a predetermined server may function as the client terminal and the client terminal may be arranged on the network 5.

Further, while the services and the logic information are displayed by the icons in the instruction sheet screen in the aforementioned first and second embodiments, they may be displayed by sequences of characters.

What is claimed is:

1. A linking information making apparatus comprising:
 a service information obtaining section that obtains, via a network, information relating to respective services of performing a series of processing with respect to document data;
 a service display section that displays service symbol information expressing the respective services based on the information relating to the respective services obtained by the service information obtaining section;
 a logic information display section that displays logic symbol information expressing logic information that logically links the respective services, the logic information includes at least transition, branch, iteration, and termination of workflow processing; and
 a linking information making section that generates a workflow processing information that logically links the respective services by dragging and dropping selected service symbol information selected from among the service symbol information displayed on the service display section and selected logic symbol information selected from among the logic symbol information displayed on the logic information display section to a linking information display section, properties of the selected services symbol information and the selected logic symbol information being displayed on a property display section and set by a user,
 wherein the service display section, the logic information display section, the linking information display section, and the property display section are displayed on one screen, and
 wherein the logic symbol information displayed on the logic information display section includes user specified properties which include at least a number of branches to link the respective services and conditions of each branch.

2. The linking information making apparatus of claim 1, the linking information making section further comprising a property setting section for setting a property relating to a service corresponding to the selected service symbol information.

3. The linking information making apparatus of claim 1, wherein
 the information relating to the respective services includes information relating to input/output of the respective services, and
 wherein the linking information making section determines if the link between the respective services is consistent based on the information relating to the input/output of the respective services corresponding to the selected service symbol information, and when the linking information making section determines that the link between the respective services is inconsistent, the linking information making section informs that there is inconsistency.

4. The linking information making apparatus of claim 1, further comprising an editing section that, after linking information is made by the linking information making section, edits the linking information.

5. The linking information making apparatus of claim 1, further comprising an execution-state display section for displaying a state of execution of the linking information made by the linking information making section.

6. The linking information making apparatus of claim 1, wherein the service symbol information is figures and/or sequences of characters expressing the respective services.

7. The linking information making apparatus of claim 1, wherein the logic symbol information is figures and/or sequences of characters expressing the logic information that logically links the respective services.

8. The linking information making apparatus of claim 1, further comprising a selection results display section that, before the linking information making section makes the linking information, displays information regarding the selected service symbol information selected from among the service symbol information displayed on the service display section and the selected logic symbol information selected from among logic symbol information displayed on the logic information display section.

9. The linking information making apparatus of claim 1, wherein the conditions of each branch include at least one of:
   a time zone when the document data is inputted,
   a receiver of the document data,
   a status indicating whether or not the document data has been approved, and
   a maker of the document data.

10. The linking information making apparatus of claim 1, wherein the linking information making section outputs the generated workflow processing information as an xml instruction file.

11. A computer-readable medium storing a computer program, the computer program:
   obtaining, via a network, information that relates to respective services of performing a series of processing with respect to document data;
   displaying service symbol information that expresses the respective services based on the information that relate to the respective services;
   displaying logic symbol information that expresses logic information that logically links the respective services, the logic information includes at least transition, branch, iteration, and termination of workflow processing;
   generating a workflow processing information that logically links the respective services by dragging and dropping service symbol information selected from among the displayed service symbol information expressing the respective services and logic symbol information selected from among the displayed logic symbol information expressing the logic information that logically links the respective services to displayed linking information, and
   displaying properties of the selected services symbol information and the selected logic symbol information,
   wherein the following are displayed on one screen:
      (i) service symbol information;
      (ii) logic symbol information; and
      (iii) properties of the selected services symbol information and the selected logic symbol information,
   wherein the logic symbol information displayed on the logic information display section includes user specified properties which include at least a number of branches to link the respective services and conditions of each branch, and
   wherein the properties of the selected services symbol information and the selected logic symbol information are set by a user.

12. The computer-readable medium of claim 11, wherein the conditions of each branch include at least one of:
   a time zone when the document data is inputted,
   a receiver of the document data,
   a status indicating whether or not the document data has been approved, and
   a maker of the document data.

13. The computer-readable medium of claim 11, wherein the generated workflow processing information is output as an xml instruction file.

14. The computer-readable medium of claim 11, the computer program:
   setting a property relating to a service corresponding to the selected service symbol information.

15. The computer-readable medium of claim 11, wherein:
   the information relating to the respective services includes information relating to input/output of the respective services, and
   the computer program determines if the link between the respective services is consistent based on the information relating to the input/output of the respective services corresponding to the selected service symbol information, and when the computer program determines that the link between the respective services is inconsistent, the computer program informs that there is inconsistency.

16. The computer-readable medium of claim 11, wherein:
   the computer program edits the linking information.

17. The computer-readable medium of claim 11, wherein:
   the computer program displays displaying a state of execution of the linking information.

18. The computer-readable medium of claim 11, wherein:
   the service symbol information is figures and/or sequences of characters expressing the respective services.

19. The computer-readable medium of claim 11, wherein:
   the computer program displays information regarding the service symbol information selected from among the selected service symbol information, the information regarding the service symbol information selected from among the selected service symbol information being displayed before the linking information is created.

* * * * *